US009373456B2

(12) United States Patent
Yang et al.

(10) Patent No.: US 9,373,456 B2
(45) Date of Patent: Jun. 21, 2016

(54) CIRCUIT BREAKERS WITH CLOCK SPRING DRIVES AND/OR MULTI-LOBE DRIVE CAMS AND RELATED ACTUATORS AND METHODS

(71) Applicant: Eaton Corporation, Cleveland, OH (US)

(72) Inventors: Chao Yang, ShenZhen (CN); CaiYing Ding, ShenZhen (CN); Li Yu, Shanghai (CN); Roger Briggs, Menomonee Falls, WI (US); Wilbert Arthur Henrik deVries, Suzhou (CN)

(73) Assignee: Eaton Corporation, Cleveland, OH (US)

(*) Notice: Subject to any disclaimer, the term of this patent is extended or adjusted under 35 U.S.C. 154(b) by 154 days.

(21) Appl. No.: 14/260,772

(22) Filed: Apr. 24, 2014

(65) Prior Publication Data

US 2015/0311005 A1 Oct. 29, 2015

(51) Int. Cl.
*H01H 3/30* (2006.01)
*H01H 3/38* (2006.01)
(Continued)

(52) U.S. Cl.
CPC ........... *H01H 3/3015* (2013.01); *H01H 3/3026* (2013.01); *H01H 3/3031* (2013.01); *H01H 3/3042* (2013.01); *H01H 3/38* (2013.01);
(Continued)

(58) Field of Classification Search
CPC ....... H01H 33/40; H01H 3/3026; H01H 3/30; H01H 33/42; Y10T 74/19; Y10T 74/19642
USPC ........ 74/412 R, 413, 435; 200/329, 501, 325, 200/400, 568
See application file for complete search history.

(56) References Cited

U.S. PATENT DOCUMENTS 2,470,675 A 5/1949 Allan et al.
3,906,805 A * 9/1975 Badger .................. H03J 1/045 334/39
4,019,008 A 4/1977 Kohler et al.
(Continued)

FOREIGN PATENT DOCUMENTS

DE 2201938 7/1973
DE 2244825 3/1974
(Continued)

OTHER PUBLICATIONS

International Search Report and Written Opinion for corresponding PCT Application No. PCT/IB2015/052832, date of mailing Jul. 21, 2015, 12 pages.
(Continued)

*Primary Examiner* — Renne Luebke
*Assistant Examiner* — Ahmed Saeed
(74) *Attorney, Agent, or Firm* — Myers Bigel & Sibley, P.A.

(57) ABSTRACT

Spring operated actuator devices for an electrical circuit breaker and/or electrical switching device include at least one clock spring comprising a disc shaped body with gear teeth and a spiral spring, a cam shaft holding the at least one clock spring with an inner end portion of the spiral spring attached to the cam shaft, and a drive cam held by the cam shaft adapted to be in communication with a follower that directs an actuator to open or close a mobile contact to maintain open and closed energy status of the electrical circuit. The at least one clock spring is configured as a closing spring of the spring operated actuator.

22 Claims, 19 Drawing Sheets

(51) Int. Cl.
*H01H 3/42* (2006.01)
*H01H 33/666* (2006.01)

(52) U.S. Cl.
CPC ............... *H01H3/42* (2013.01); *H01H 33/666* (2013.01); *H01H 2235/01* (2013.01); *H01H 2235/016* (2013.01)

(56) References Cited

U.S. PATENT DOCUMENTS

| | | | | |
|---|---|---|---|---|
| 4,649,244 | A | 3/1987 | Baginski et al. | |
| 4,678,877 | A | 7/1987 | Nicoloso | |
| 4,996,397 | A | 2/1991 | Kuhn et al. | |
| 6,180,902 | B1 | 1/2001 | Kowalyshen et al. | |
| 6,336,605 | B1 * | 1/2002 | Littau | A01K 89/0155 242/286 |
| 6,667,452 | B2 | 12/2003 | Spiegel | |
| 8,618,430 | B2 | 12/2013 | Staffas et al. | |
| 2001/0023620 | A1 * | 9/2001 | Spurr | E05B 81/25 74/412 R |
| 2006/0035739 | A1 * | 2/2006 | Osborn | F16H 1/34 474/155 |
| 2014/0326092 | A1 * | 11/2014 | Tokozakura | F16H 55/06 74/325 |

FOREIGN PATENT DOCUMENTS

| | | |
|---|---|---|
| DE | 19605711 | 8/1997 |
| EP | 1331654 | 7/2003 |
| EP | 2189995 | 5/2010 |
| EP | 2249361 | 11/2010 |

OTHER PUBLICATIONS

Eaton User manual W-VAC*i*, 17.5kV W-VAC*i*MB 25 kA 1250A IEC Mining Vacuum Circuit Breakers, 43 pages, Oct. 2012.

* cited by examiner

CIRCUIT BREAKERS WITH CLOCK SPRING DRIVES AND/OR MULTI-LOBE DRIVE CAMS AND RELATED ACTUATORS AND METHODS

FIELD OF THE INVENTION

The present invention relates to operator mechanisms for circuit breakers.

BACKGROUND OF THE INVENTION

Circuit breakers are one of a variety of overcurrent protection devices used for circuit protection and isolation. The circuit breaker provides electrical protection whenever an electric abnormality occurs.

In a power transmission or distribution network, switching apparatuses are incorporated into the network to provide automatic protection in response to abnormal load conditions or to permit opening or closing (switching) of sections of the network. The switching apparatus may therefore be called upon to perform a number of different operations such as interruption of terminal faults or short line faults, interruption of small inductive currents, interruption of capacitive currents, out-of-phase switching or no-load switching, all of which operations are well known to a person skilled in the art.

One type of circuit breaker is a vacuum circuit breaker that open and close primary circuits using vacuum interrupters (VI). A device used to open and close the VI is the operating mechanism or unit (e.g., often a modular, self-contained unit). The operating mechanism is configured to maintain opening and closing energy and facilitate closing an opening of the operation mechanism. Stated differently, in switching apparatuses, the actual opening or closing operation is carried out by two contacts where normally one is stationary and the other is mobile. The mobile contact is operated by an operating assembly that includes an actuator and an operator mechanism, where the operator mechanism operatively connects the actuator to the mobile contact.

Actuators of known operating devices for medium and high voltage switches and circuit breakers are of the spring operated, the hydraulic or the electromagnetic type. An operator mechanism converts the motion of the actuator, e.g., spring-actuated drive unit into a translation movement of the mobile contact. A spring operated actuator, or spring drive unit as it is also called, generally uses two springs for operating the circuit breaker; an opening spring for opening the circuit breaker and a closing spring for closing the circuit breaker and reloading the opening spring. In its closed position the mobile contact and the stationary contact of the circuit breaker are in contact with each other and the opening spring and the closing spring of the operating device are charged. Upon an opening command the opening spring opens the circuit breaker, separating the contacts. Upon a closing command the closing spring closes the circuit breaker and, at the same time, charges the opening spring. The opening spring is now ready to perform a second opening operation if necessary. When the closing spring has closed the circuit breaker, the electrical motor in the operating device recharges the closing spring. This recharging operation takes several seconds. The circuit breaker can be locked in open and closed operational status using trip latch open and trip close latch units that lock the operator mechanism in the stated positions. Examples of spring actuated drives are described in U.S. Pat. Nos. 4,678,877 and 6,667,452, the contents of which are hereby incorporated by reference as if recited in full herein.

Unfortunately, conventional compression closing springs may apply a relatively large spring force that can present operational issues, e.g., the closing spring force may push up on a main shaft when it is charged and put a large moment on the shaft with potentially undue stress on shaft bearings and/or misalignment in operational components such as a frame in communication with the shaft. There remains a need for alternate operator mechanisms for circuit breakers and switches.

SUMMARY OF EMBODIMENTS OF THE INVENTION

Embodiments of the present invention are directed to operator mechanisms with spring-actuated drives that include at least one clock spring held on a cam shaft with a drive cam configured to close a circuit breaker.

The at least one clock spring can be configured as a closing spring of the operator mechanism that is configured to drive a pinion associated with an electric motor and that can be used without requiring a compression closing spring.

Embodiments of the invention are directed to actuator devices that include at least one clock spring comprising a disc shaped body with gear teeth and a spiral spring, a cam shaft holding the at least one clock spring with an inner end portion of the spiral spring attached to the cam shaft, and a drive cam held by the cam shaft adapted to be in communication with a follower that is mechanically linked to a circuit interrupter.

The actuator devices can direct an actuator to open or close a mobile contact to maintain open and closed energy status of the electrical circuit.

The at least one clock spring can be configured as a closing spring of the spring operated actuator.

The disc shaped body of the at least one clock spring can have an outer perimeter with the gear teeth. The gear teeth can be in communication with a pinion of a clutch attached to an electric motor.

The at least one clock spring can include a plurality of clock springs.

The plurality of clock springs can all attached to the drive cam shaft such that rotation of the drive cam shaft in a defined direction compresses the spiral springs.

The drive cam can have a perimeter with a plurality of spaced apart lobes and a plurality of spaced apart valleys, the lobes and valleys can be arranged such that adjacent lobes are separated by a respective valley. Each lobe can define a closing point and each valley can define an opening point of the electrical circuit.

The drive cam can include three lobes and three valleys.

The drive cam can include two lobes and two valleys.

The at least one clock spring can be a plurality of clock springs that can be releasably attached to the drive cam shaft for modular build configurations.

The scalable configuration allows the use of the design across different rated circuit breakers including different ranges of voltages and/or different ranges of current (e.g., about 630 A to about 315 A) and/or different ranges of short circuit currents (e.g., about 25 kA, about 31.5 kA, about 40 kA, and about 50 kA).

The drive cam can have a cam profile with three lobes and three valleys with the valleys associated with trip open positions of a circuit breaker and the lobes associated with trip closed positions of the circuit breaker. A minima radian of a respective valley can be circumferentially separated from an adjacent maxima radian of a respective lobe by between about 5 to about 20 degrees.

The drive cam can have a cam profile with two lobes and two valleys, with the valleys associated with trip open positions of a circuit breaker and the lobes associated with trip closed positions of the circuit breaker. A minima radian of a respective valley can be circumferentially separated from an adjacent maxima radian of a respective lobe by between about 5 to about 20 degrees.

The inner end portion of a respective spiral spring of the at least one clock spring can be configured to extend as a planar segment across a center gap space inside turns of the spiral spring. The cam shaft can have an outer end portion with a radially extending slot that slidably receives the planar segment of a respective spiral spring.

The devices can include a trip latch in communication with the drive cam to lock the drive cam in a trip open and/or trip closed position.

In some embodiments, the trip latch includes a first stop cam and a second stop cam held on the cam shaft.

The device can include a follower residing against the drive cam and a main shaft in communication with the follower configured to maintain open and closed energy status of the circuit breaker responsive to a position of the drive cam and the trip latch.

The drive cam can have a plurality of spaced apart working positions about its perimeter allowing multiple holding locations for trip open and trip closed positions in a single revolution.

Still other embodiments are directed to operator mechanisms for an electrical circuit of a circuit breaker or electrical switching apparatus. The mechanisms include: (a) at least one clock spring comprising a disc shaped body with gear teeth and a spiral spring, wherein the at least one clock spring is configured as a closing spring; (b) a cam shaft holding the at least one clock spring with an inner end portion of the spiral spring attached to the cam shaft; (c) a drive cam held by the cam shaft adapted to be in communication with a follower that directs an actuator to open or close a mobile contact to maintain open and closed energy status of the electrical circuit; (d) a follower held by a linkage in cooperating alignment with the drive cam; (d) an electric motor having a clutch with a pinion, the pinion in communication with the gear teeth of the at least one clock spring; and (e) a main shaft in communication with the linkage and arranged to cause the actuator to open or close the electrical circuit.

The disc shaped body of the at least one clock spring can have an outer perimeter. The gear teeth reside on the perimeter and are in communication with the pinion of a clutch attached to an electric motor.

The at least one clock spring can include a plurality of clock springs. The plurality of clock springs can all be attached to the drive cam shaft such that rotation of the drive cam shaft in a defined direction compresses the spiral springs.

The drive cam can have a perimeter with a plurality of spaced apart lobes and a plurality of spaced apart valleys, such that adjacent lobes are separated by a respective valley, and wherein each lobe defines a closing point and each valley defines an opening point of the electrical circuit The drive cam can include three lobes and at least three valleys.

The drive cam can include two lobes and at least two valleys.

The drive cam can have a profile with a first lobe that merges into two adjacent shallow valleys, that merge into a second lobe that then merges into two adjacent shallow valleys.

The at least one clock spring can be a plurality of stackable clock springs that can be releasably attached to the drive cam shaft. Inner end portions of the spiral springs extend as axially spaced apart planar segments across a center gap spaced formed by turns of the spiral spring. The single rotatable shaft includes an outer end portion with a radially extending slot that slidably receives the planar segments of the spiral springs.

Other embodiments are directed to operator mechanisms for an electrical circuit of a circuit breaker that include: (a) a cam shaft; a drive cam held by the cam shaft, with the drive cam having a cam profile with a plurality of lobes and valleys, the valleys associated with trip open positions of the circuit breaker and the lobes associated with trip closed positions of the circuit breaker thereby providing multiple hold locations for trip open and trip closed positions in a single revolution of the drive cam; (b) a follower held in cooperating alignment with the drive cam; an electric motor having a clutch with a pinion, the pinion in communication with the cam shaft; and (c) a linkage in communication with the follower that directs an actuator to open or close a mobile contact to maintain open and closed energy status of the electrical circuit.

A minima radian of a respective valley can be circumferentially separated from an adjacent maxima radian of a respective lobe by between about 5 to about 20 degrees.

Other embodiments are directed to methods of using a spring-actuated closing spring in a circuit breaker. The methods include: (a) automatically rotating a drive cam shaft holding at least one drive cam and at least one clock spring with a respective spiral spring, wherein one of the at least one clock gear comprises gear teeth; (b) automatically compressing and uncompressing a respective spiral spring of the at least one clock spring responsive to winding and unwinding rotation directions of the drive cam shaft; (c) turning a pinion gear associated with clutch attached to an electric motor based on rotation of the clock spring gear teeth; and (d) opening and closing an electric circuit based on whether the drive cam is in an open position or a closed position.

Successive opening and closing operations can be carried out based on drive cam movements of less than 90 degrees with the drive cam configured to rotate in a single direction and provide a plurality of serially alternating closing and opening points about its 360 degree perimeter.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION OF EMBODIMENTS OF THE INVENTION

Figure 1:
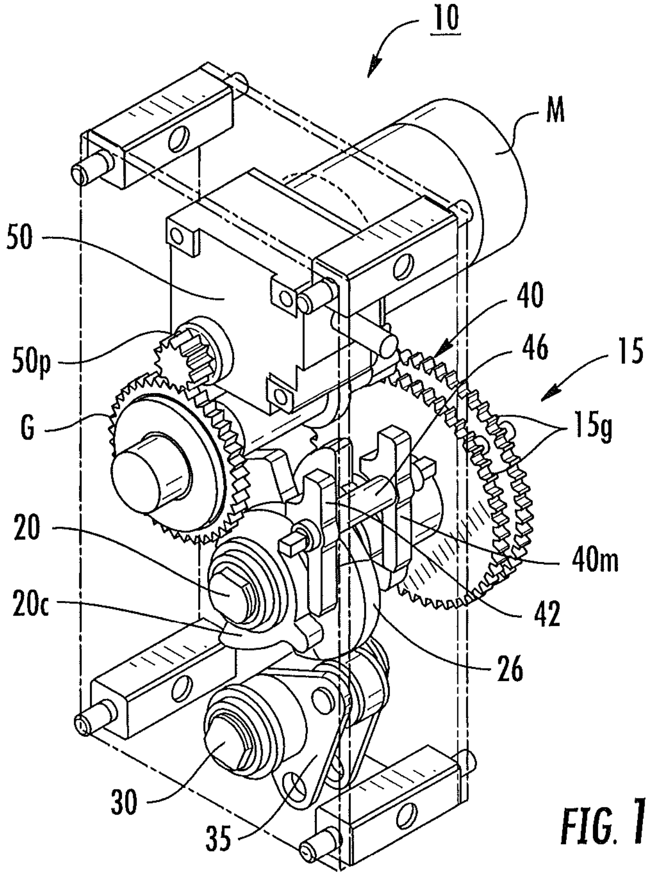
FIG. 1 is a side perspective view of an operator mechanism with at least one clock spring as the closing spring for a spring-actuated drive according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 40, 40', 40'', 40''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In the following, operator mechanisms will be described operating a circuit breaker but similar known operating mechanisms may also operate switches.

The term "medium voltage" with respect to circuit breakers is conventionally meant with respect to a voltage level in the range of 1-72 kV. The term "high voltage" refers to a voltage level above 72 kV. The term "low voltage" refers to voltages below 1 kV.

Embodiments of the invention relate to an operator mechanism and/or electric switching apparatus that includes a clock spring-operated actuator. Preferably the switching apparatus is a medium or high voltage switching apparatus such as a medium or high voltage vacuum circuit breaker.

Referring now to the figures, FIG. 1 illustrates an example of an operator mechanism 10 comprising at least one clock spring 15 as the closing spring, eliminating the requirement of a compression spring as the spring driven closing spring actuator as is conventional. The clock spring 15 is typically configured as a spring gear 15*g* with a perimeter having gear teeth 16 and holding a spiral spring 17 (FIG. 3B). The operator mechanism 10 also includes at least one (typically a single one) drive cam 26 held on a cam shaft 20. The clock spring 15 can also be held on the cam shaft 20. The at least one clock spring 15 is in communication with a pinion gear 50*p* associated with the electric motor M, typically via a clutch 50. The gear teeth 16 of the at least one clock spring can indirectly or directly drive the pinion gear 50*p* associated with the motor M. As shown, the gear teeth 16 indirectly connect to the pinion gear 50*p* via a gear system comprising one or more gears G. The gear teeth 16 may reside at an inner perimeter or medial segment of the at least one clock gear 15 rather than an outer perimeter as shown. Complementary gearing can be used to connect to the pinion or other desired drive input.

Figure 2A:
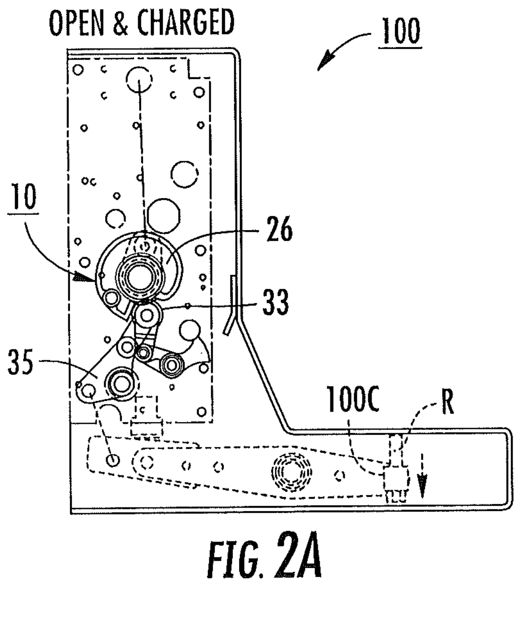
FIGS. 2A and 2B are schematic illustrations of two operative positions of an operator mechanism that can be configured to use the clock-spring drive according to embodiments of the present invention. The open and charged position is shown in FIG. 2A. The closing and uncharged position is shown in FIG. 2B.
Figure 2B:
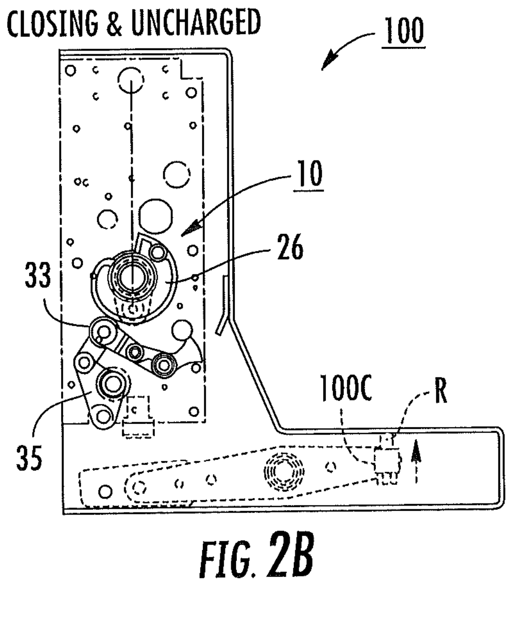

As shown in FIG. 1, the drive cam 26 is in communication with a follower 33 held by a linkage 35 that also is attached to a main shaft 30. The follower 33 responds to the open and close positions on the drive cam 26 to open and close a circuit, e.g., to move away from contacts 100*c* (FIG. 2A) or to engage contacts (FIG. 2B). FIGS. 2A and 2B illustrate the drive cam 26 with a single open position (valley) and a single lobe for the closing position against one or more contacts 100*c*. FIGS. 1, 3A, 8A, 8B, 9A and 9B illustrate other embodiments of the drive cam 26. The drive cam 26 can be aligned with and contact a follower 33 in communication with a main shaft 30. The follower 33 and the main shaft 30 can be held in a linkage 35 that allows the shaft 30 to pivot inside the breaker 100 (FIGS. 2A, 2B, 13) in response to movement of the follower 33 against the drive cam 26 for the opening and closing operations. The linkage 35 can have various shapes and is not limited to that shown. The linkage 35 can be configured to attach to a pivoting linkage L (FIGS. 22C, 23C) with an end that translates up and down to move one or more upwardly extending rods or links to open and close a circuit breaker, e.g., a vacuum interrupter (FIGS. 22C, 23C).

The at least one clock spring 15 can be configured to provide an opposite force against the opening spring 88 (FIGS. 22D, 23D) in order to absorb the energy at the end of an opening operation due to the design of the drive cam 26.

Figure 23B:
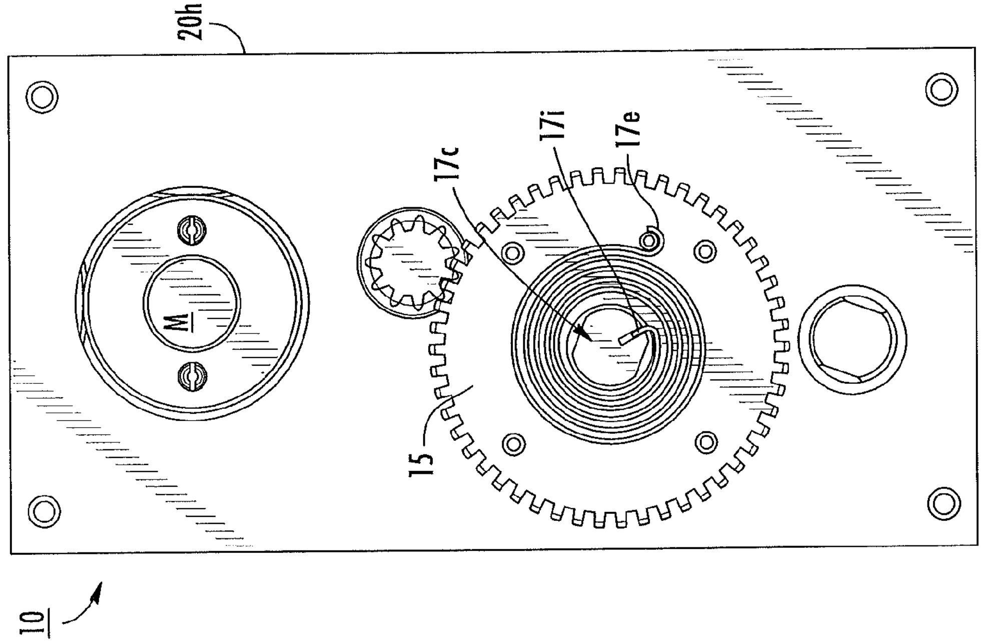
FIG. 23B is a front view of the operator mechanism shown in FIG. 23A according to embodiments of the present invention.
Figure 23A:
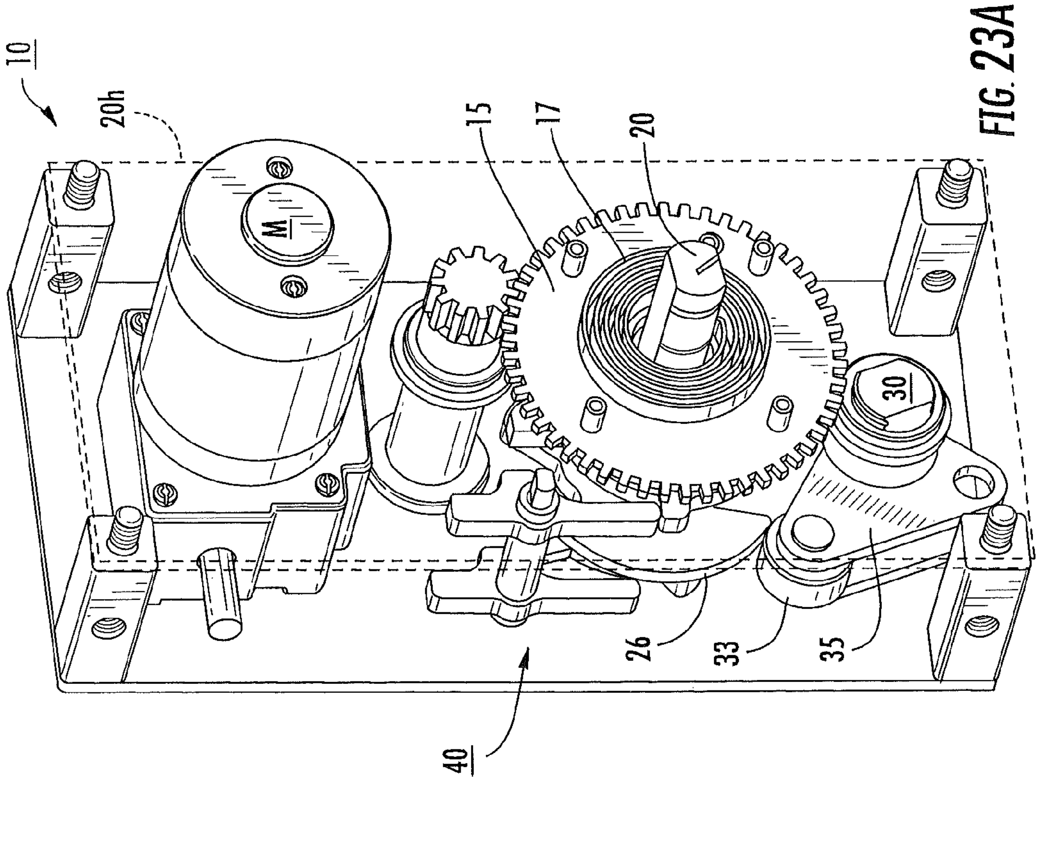
FIG. 23A is a partial side perspective view of an exemplary operator mechanism in a trip close position according to embodiments of the present invention.
Figure 23C:
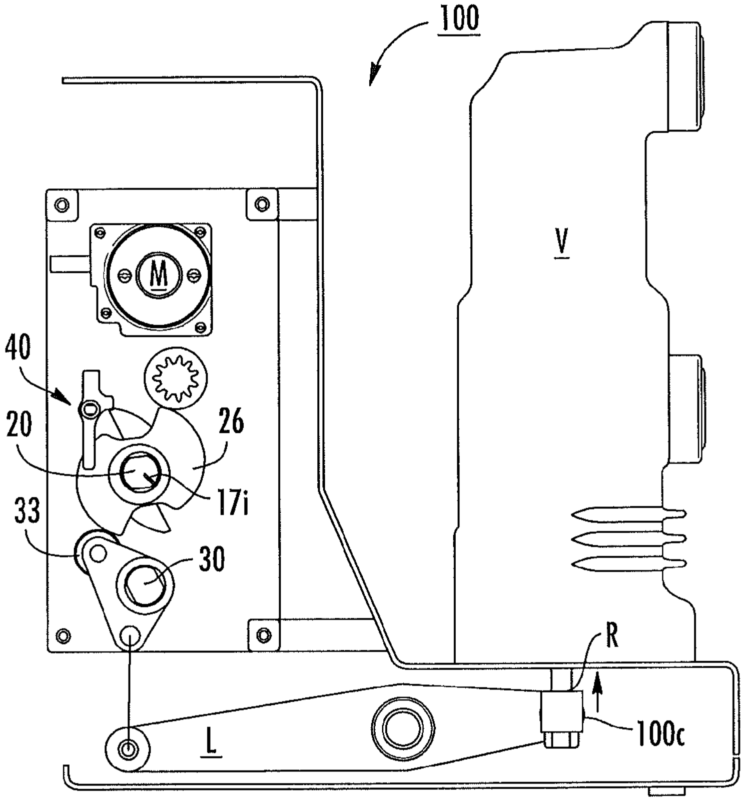
FIG. 23C is a cutaway side view of the operator mechanism shown in FIG. 23A in a circuit breaker as it is connected to a linkage that moves contacts to open and close a circuit breaker (shown in a trip close position) according to some embodiments of the present invention.

The at least one clock spring 15 is the spring-actuated drive that causes the linkage 35 of the operator mechanism 10 and/or circuit breaker 100 to move to the linkage L to a trip close position (FIG. 2B, 23C). For a three phase breaker the at least one clock spring 15 can be configured to simultaneously move the movable contact part of each phase.

The at least one clock spring 15 can be configured to operate with a smooth, high precision transmission and may reduce or eliminate unbalanced forces generated by conventional closing compression springs. The clock spring closing drive configuration can operate with a transmission precision with low rotational stiffness and can have the same storing and releasing operational direction.

The clock spring can reduce or eliminate force imbalances caused by some conventional compression closing spring arrangements and can reduce the spring volume by greater than 50% (typically by about 85%) to allow for a more compact configuration.

Still referring to FIG. 1, the operator mechanism 10 can also include a trip latch assembly 40. The trip latch assembly 40 may optionally include at least one stop cam 20*c* held by the cam shaft 20 and a cooperating latch member 40*m*. In some particular embodiments, as will be discussed further below, the trip latch assembly 40 can include first and second stop cams 22, 24 that cooperate with a respective one of a trip-open latch 44 and a trip close latch 42 (FIG. 7B). However, other latch configurations may be used.

Figure 3A:
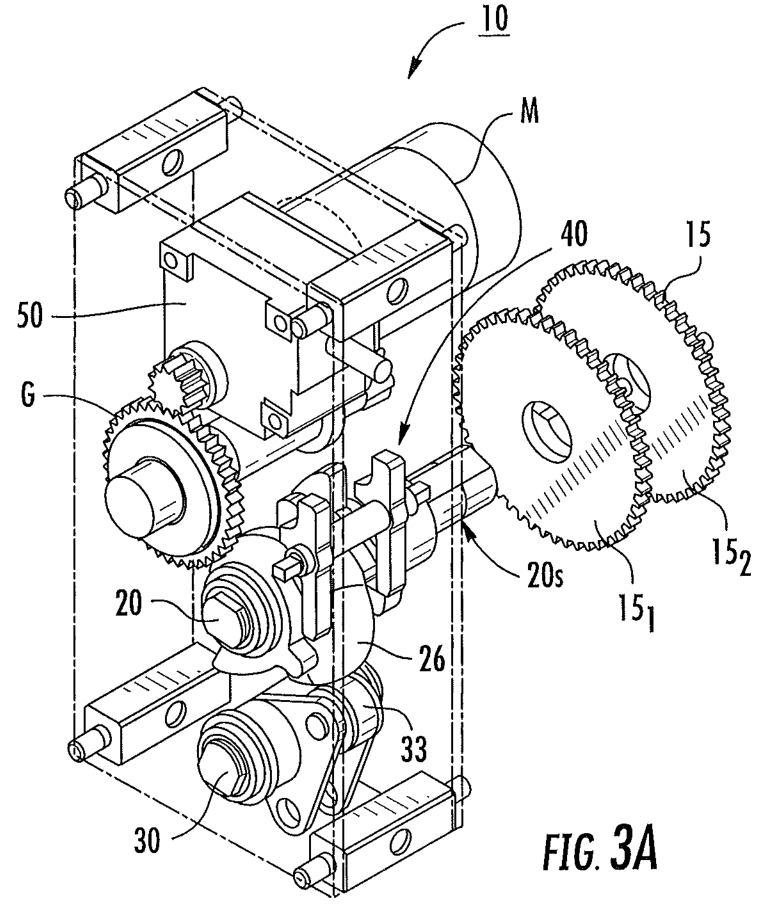
FIG. 3A is a partial exploded view of the operator mechanism shown in FIG. 1.
Figure 3B:
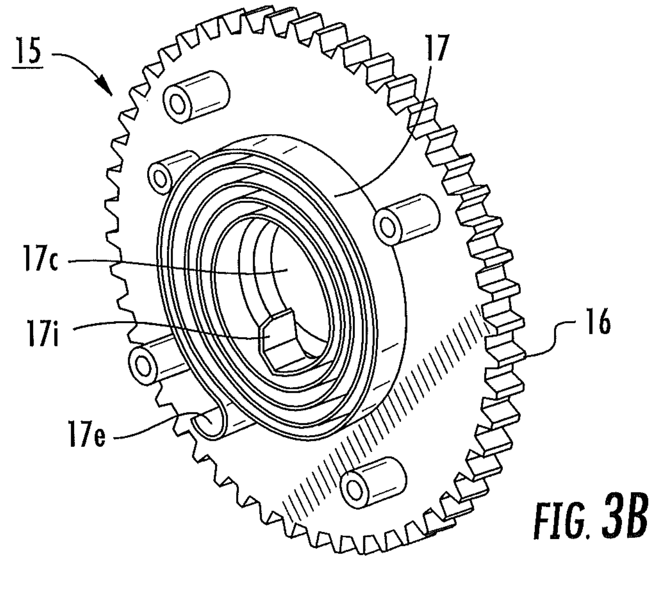
FIG. 3B is a side perspective view of an exemplary clock spring embodied as a gear wheel comprising a spiral spring according to embodiments of the present invention.

FIG. 3A illustrates that the operator mechanism 10 can be configured to allow a modular arrangement of one or more clock springs $\mathbf{15}_1$, $\mathbf{15}_2$. Although shown as two closely spaced, adjacent clock springs $\mathbf{15}_1$, $\mathbf{15}_2$, that may abut each other, the clock springs 15 may include one or more than two and may be spaced further apart on the same shaft 20. When more than one clock spring 15 is used, the clock springs 15 may be spaced apart on the shaft 20 and neighboring springs may be regularly spaced or irregularly spaced apart on the shaft 20. Where two or more clock springs 15 are used, they may have the same size and configuration. In some embodiments, one or more of the more than one clock spring may be devoid of gear teeth. Where more than one clock spring 15 is used, they may have the same or different spiral spring 17 configurations and/or materials and may have the same or different rotational stiffness, for example.

The clock springs 15 can have a scalable modular design to allow the same part (e.g., same size and shape clock spring) to be used in different numbers on a respective drive shaft 20 to meet different load requirements of different (typically medium) voltage vacuum circuit breakers 100. The scalable configuration can be such as to allow the use of the clock spring design across different circuit breakers including different rated circuit breakers including different ranges of voltages and/or different ranges of current (e.g., between about 630 A to about 315 A) and/or different ranges of short circuit currents such as between about 10 kA to about 100 kA (e.g., about 25 kA, about 31.5 kA, about 40 kA, and about 50 kA).

Figure 5:
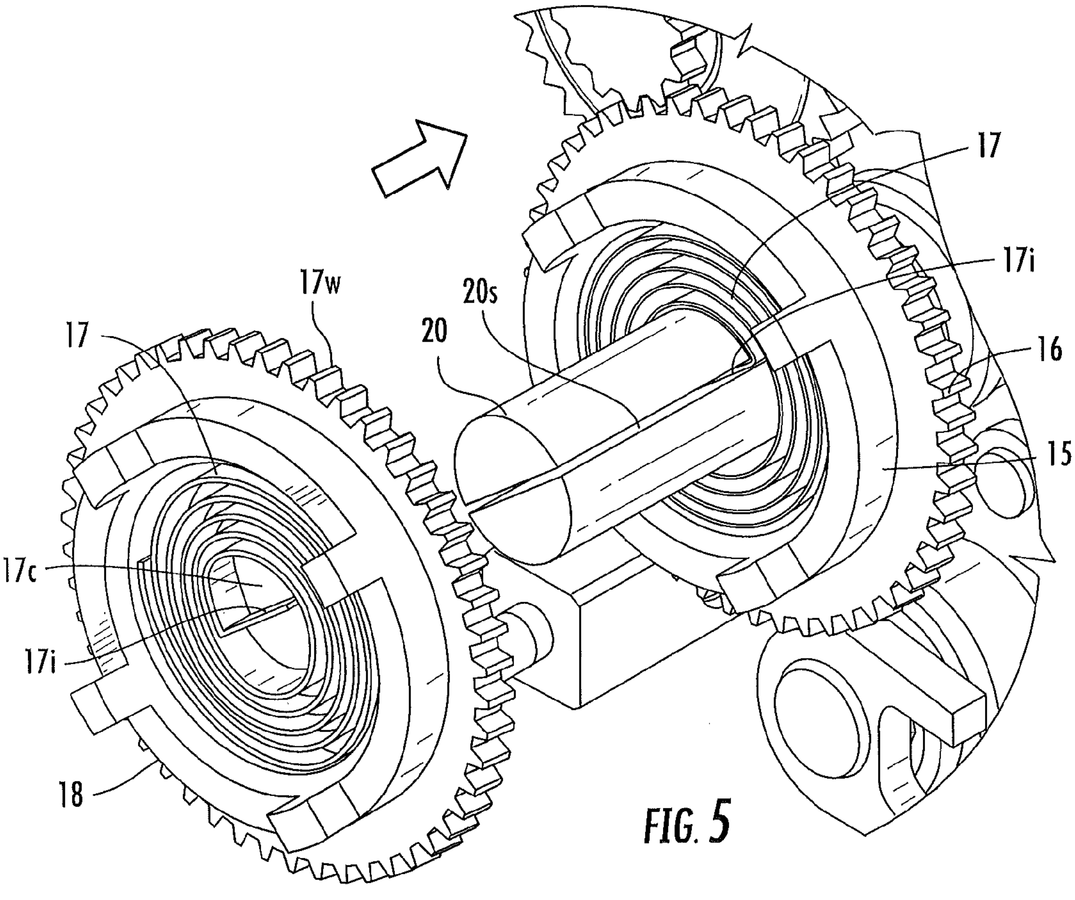
FIG. 5 is a partial exploded view of a clock spring configuration according to embodiments of the present invention.

FIG. 3B illustrates that the spiral spring 17 can have an inner end 17*i* and an outer end 17*e*. The inner end 17*e* can be attached to the cam shaft 20. As shown in FIG. 3A, the slot 20 can be a circumferentially extending slot residing in an outer wall of the shaft 20. The spring inner end 17*i* can protrude radially inward to span across at least a portion of the inner circle 17*c* enclosed by a number of turns of the spiral spring. FIG. 3B illustrates a short cross-span configuration of the inner end 17*i* (less than about 40% of the diameter of the inner circle 17*c*). FIG. 5 illustrates a long span of the inner end 17*i* (greater than about 50% of the diameter of the inner circle 17*c*).

FIG. 5 illustrates that the cam shaft 20 can have a slot 20*s* that extends axially inward from an end of the shaft allowing the spring inner end 17*i* of one or more clock springs 15 to be slidably inserted into the slot 20*s*, thus allowing the clock spring 15 to be easily stacked (when more than one clock spring 15 is desired) and/or inserted onto the shaft 20.

In some embodiments, the inner end 17*i* of the spring 17 of the clock spring 15 can be attached via an adhesive, coupler or other attachment member (not shown) not requiring a slot or used with the slot 20*s*.

Figure 4A:
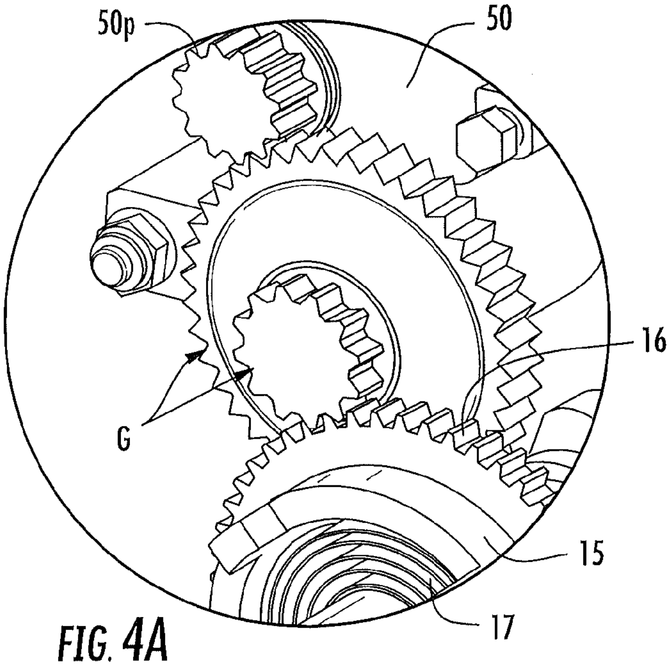
FIG. 4A is an enlarged view of the clock spring gear interface with a clutch pinion according to embodiments of the present invention.
Figure 4B:
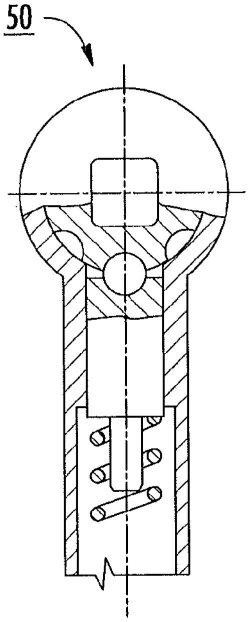
FIG. 4B is a partial cutaway view of a clutch with a flexible torque adjustment capability according to embodiments of the present invention.

The modular (scalable) configuration of the clock spring and accommodating cam shaft length 20 allows extensibility for multiple clock springs for a large and/or full series of different circuit breaker ranges. A desired number of clock springs 15 can be selected for a particular device so as to match a defined torque of the torque limited clutch 50 (FIGS. 4A, 4B). The clock springs 15 can be held on the shaft to concurrently rotate with each other and the drive cam 26. The clock springs 15 can have a disc shaped body with a flat surface or wall 17*w* on one side and a cavity 18 holding the spiral spring 17 on the other. Where more than one clock spring 15 is used, they can attach to each other with a flat outer wall of one closing a cavity of another. However, other clock spring form factors may be used as can other attachment arrangements.

As shown in FIG. 4A, the clutch 50 can have an adjustable, torque-limited configuration. The clutch 50 can have an adjustable be configured with a suitable torque associated with a fully charged closing spring. The clutch 50 can have an adjustable torque to provide a flexible ability to accommodate different operator mechanisms or different torques of different closing spring configurations (e.g., one clock spring, two clock springs, three clock springs or four clock springs, and the like). The torque of the clutch can be adjustable based on the pressure of the spring(s).

Figure 6:
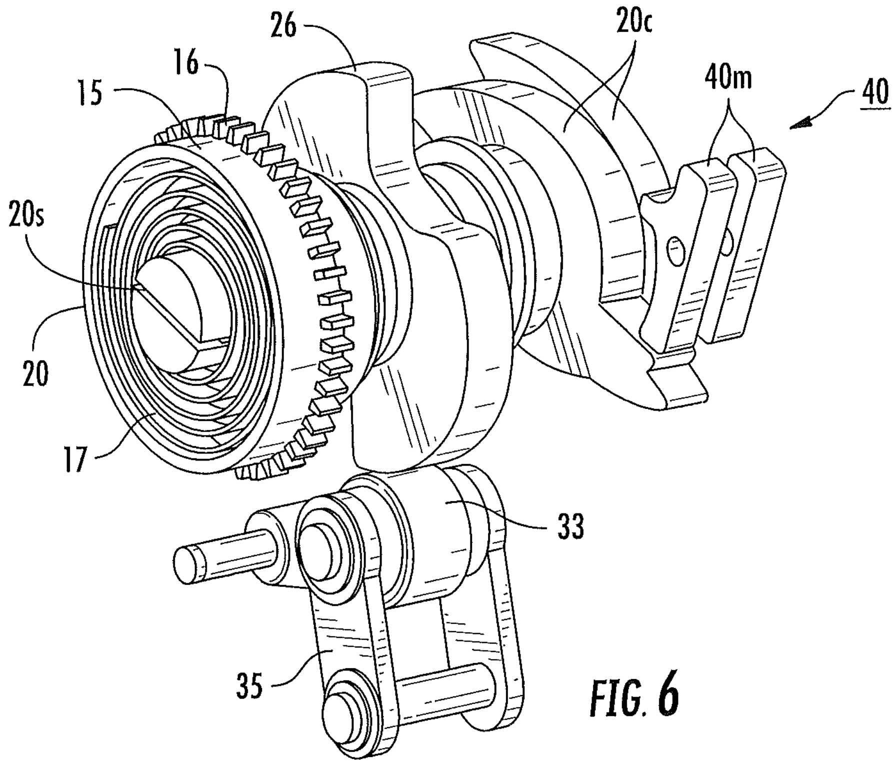
FIG. 6 is a side perspective view of an exemplary operator mechanism with a clock spring according to embodiments of the present invention.
Figure 7A:
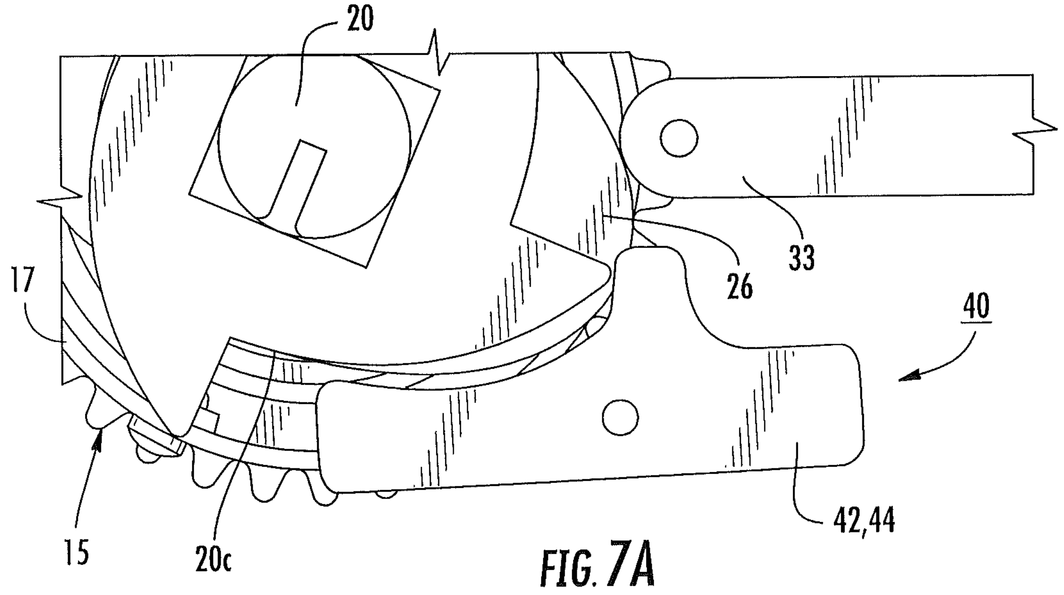
FIG. 7A is an enlarged partial view of a trip latch configuration with the clock spring-actuated drive according to embodiments of the present invention.
Figure 7B:
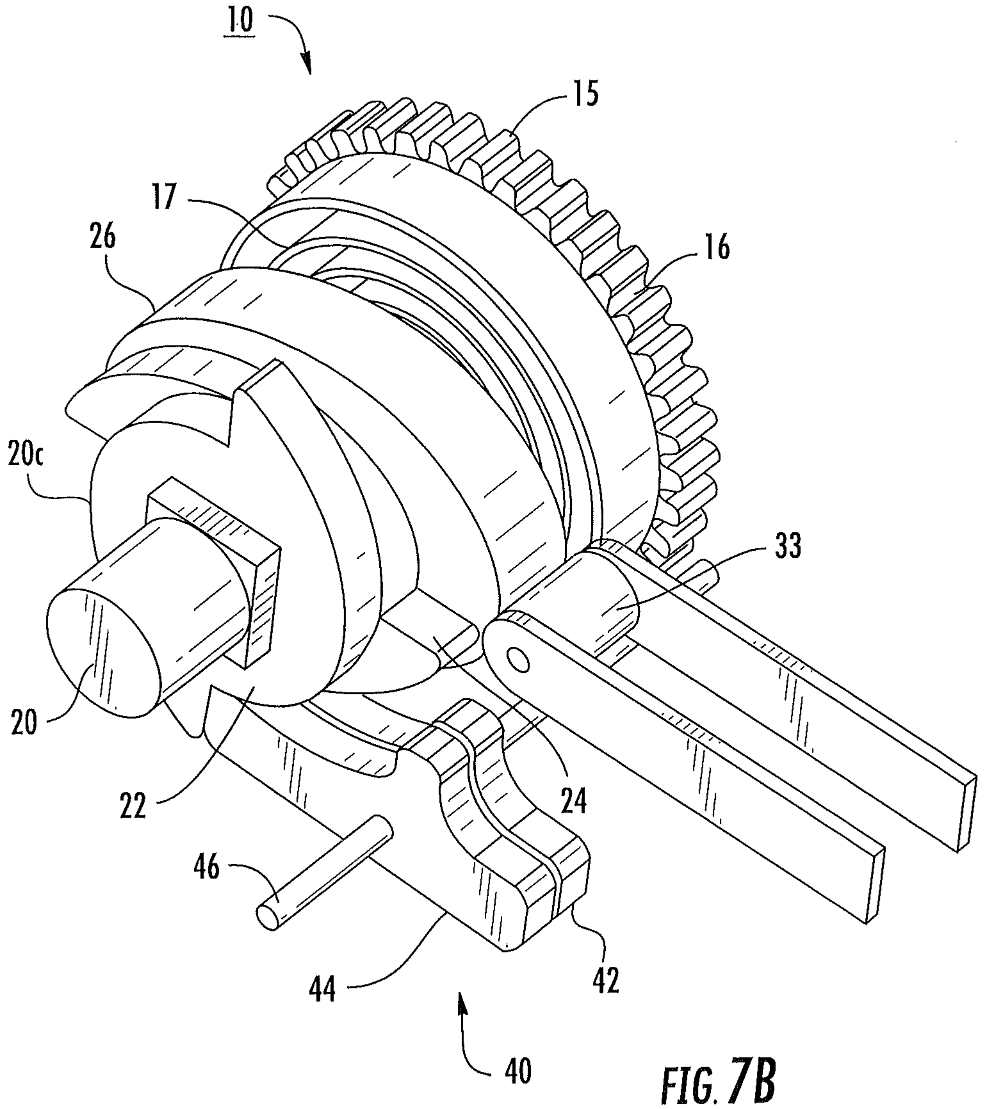
FIG. 7B is a side perspective view of the spring-actuated drive and trip latch configuration shown in FIG. 7A according to embodiments of the present invention.

FIGS. 6, 7A and 7B illustrate that the operator mechanism 10 can include a trip latch assembly 40 with first and second stop cams 20*c* (shown as latches 44, 42 in FIG. 7B) held on the cam shaft 20 and a trip open latch member 40*m* and a trip close latch member 40*m* that respectively engage one of the stop cams 20*c* (shown as stop cams 22, 24 in FIG. 7B). Each stop cam 20*c* can operate with a half cycle per closing and opening that may increase a life cycle of the clock spring 15 and/or cam 20*c*. The trip latch assembly 40 can be configured so that the latch members 40*m* self-reset without requiring a recovery spring. The trip latch assembly 40 can be configured so that there is a single cam shaft position/location for both closing and opening positions (FIGS. 2A, 2B). Further description of particular embodiments of one exemplary trip latch assembly 40 will be provided below.

When the circuit breaker 100 is triggered for an opening action, an opening spring, typically a torsion spring 88 (FIGS. 22D, 23D) pushes its actuation end fitting to rotate and thereby rotate the cam shaft 20.

In some embodiments, as shown in FIGS. 8A, 8B, 9A and 9B, the drive cam 26 can include a plurality of circumferentially spaced apart lobes 26*l* with a respective valley 26*v* positioned between adjacent lobes 26*l*. The drive cam 26 can thus have at least two separate closing points Pc, one for each respective lobe 26*l* and two separate opening positions Po, one for each respective valley 26*v* (e.g., loops) over its perimeter (in 360 degrees). The lobe 26*l* angular extension $\alpha$ is typically greater than the valley 26*v* angular extension $\beta$. The lobes 26*l* can have arcuate tapered perimeters.

The valley 26*v* can define a respective open position Po and the cam profile can have an arc (circumferential spacing) of between about 5-20 degrees from a minima radian of a valley 26*v* to a maxima radian of the cam outline at an adjacent lobe 26*l* for the next closed position Pc.

Figure 8A:
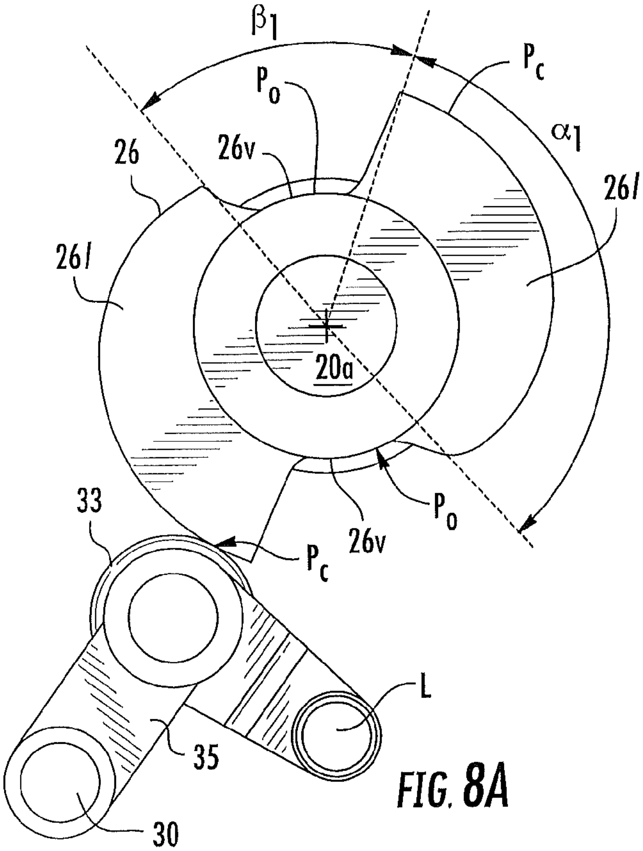
FIG. 8A is a front view of an exemplary drive cam configuration comprising two lobes according to embodiments of the present invention.
Figure 8B:
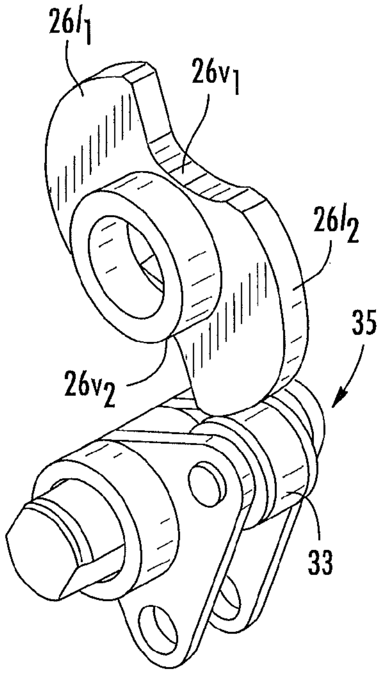
FIG. 8B is a side perspective view of an exemplary drive cam configuration also comprising two lobes according to embodiments of the present invention.
Figure 9A:
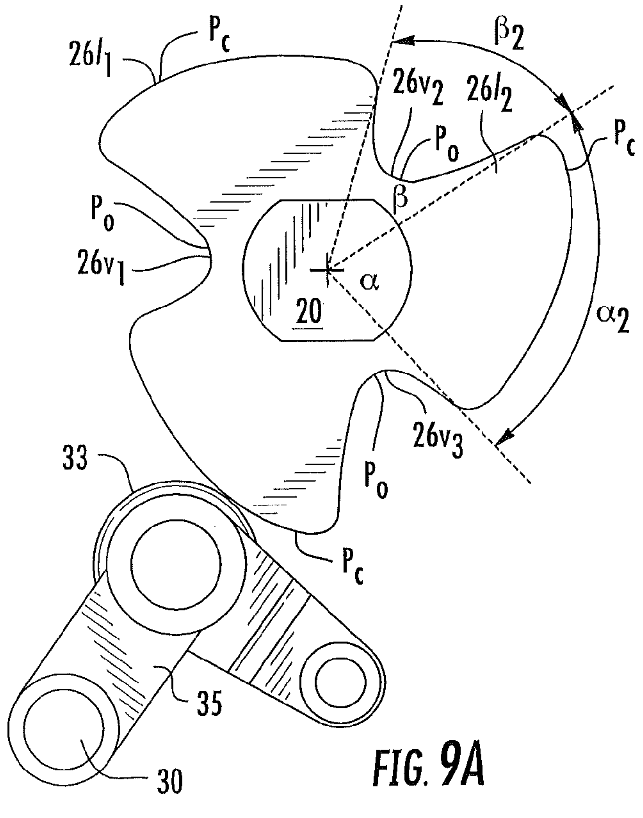
FIG. 9A is a front view of an exemplary drive cam configuration comprising three lobes according to embodiments of the present invention.
Figure 9B:
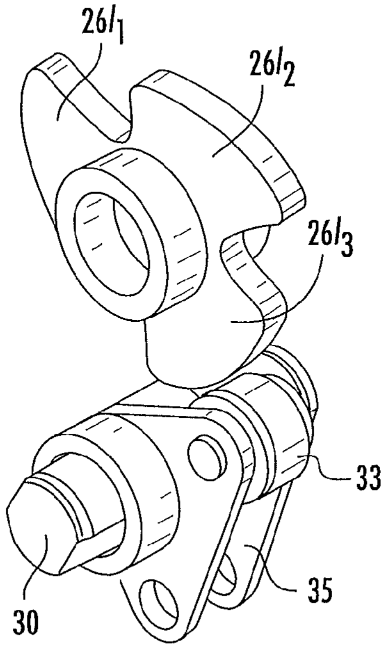
FIG. 9B is a side perspective view of an exemplary drive cam configuration also comprising three lobes according to embodiments of the present invention.

FIGS. 8A and 8B illustrates a drive cam 26 with two lobes $\mathbf{26}_{l1}$, $\mathbf{26}_{l2}$ and two diametrically opposed valleys $\mathbf{26}_{v1}$, $\mathbf{26}_{v2}$. The two lobes $\mathbf{26}_{l1}$, $\mathbf{26}_{l2}$ typically have the same shape, size and angular extensions, shown as $_{\alpha 1}$, but may have dissimilar shapes, sizes or angular extensions. The two valleys $\mathbf{26}_{v1}$, $\mathbf{26}_{v2}$ can also have the same shape, size and angular extension ($\beta_2$).

The lobe angular extension α may vary between different applications but for a two lobe design $\alpha_1$ (FIG. 8A), can be between about 20 to about 120 degrees, typically between about 60 to about 90 degrees. For a three lobe design, e.g., FIGS. 9A and 9B, the angular extension can be between about 20 to about 90 degrees, typically between about 25 degrees to about 60 degrees.

Similarly, the valley angular extension β may vary between different applications but for a two valley design $\beta_1$ (FIG. 8A), can be between about 10 to about 90 degrees, typically between about 15 to about 30 degrees. For a three lobe design, e.g., FIGS. 9A and 9B, the angular extension can be between about 10 to about 60 degrees, typically between about 10 degrees to about 30 degrees. The valleys 26*v* can taper gradually down to a minimal point defining the opening point Po as shown or may be curvilinear (up and down segments) but not protrude past the radial extension of the lobes 26*l*. The drive cam 26 may be configured to provide an energy savings of about 22% on the closing spring and reduced stress on the critical shaft 30 relative to a tension spring/UMA cam design.

Thus, in operation, by way of example of some embodiments, the drive cam 26 with the spiral spring 17 of the clock spring 15 will rotate and push the linkage 35 to close the contacts 100*c* (FIG. 2B) at a drive cam closing point Pc. An opening torsion spring 88 (FIG. 23D) can push the linkage 35 back to separate the contacts 100*c* at a drive cam 26 opening point Po. The cam shaft 20 is not required to axially translate for the open and close positions (e.g., the same shaft 20 location can be used for both closing and opening positions). The drive cam 26 may have a plurality (typically two or three) spaced apart lobes 26*l*, each with an associated respective closing point, over its perimeter allowing for less than a full turn of the drive cam 26 for each trip close position.

The drive cam 26 can be configured to match a force output characteristic of the at least one clock spring 15. The point of output characteristic is typically larger than a load. The exemplary units on the graph of FIG. 10B are by way of example only as the torque/force can vary for different load mechanisms and/or applications and the stroke distances may also change or vary from that shown on the X-axis. However, the area of the output characteristic is typically greater than the area of the load curve. The area before the contact touch (FIG. 10A, 10B) can be a value between about 4 and 8 times greater than an area of the load curve, typically about 6. The point of output characteristic should be larger than the load after contact touch with a value between about 1.2 and 2, typically about 2.5.

Figure 10A:
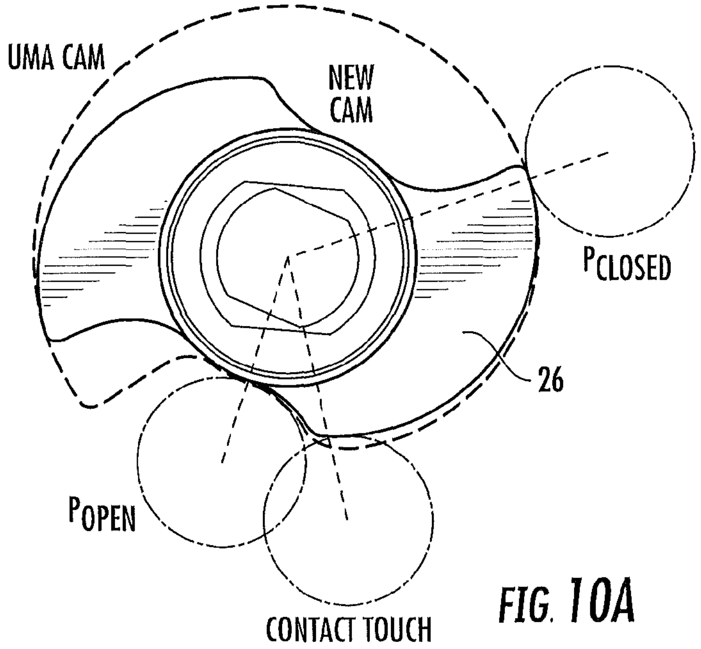
FIG. 10A is a schematic illustration of two different drive cam profiles showing an exemplary new multi-lobe cam profile relative to a conventional UMA profile according to embodiments of the present invention.
Figure 10B:
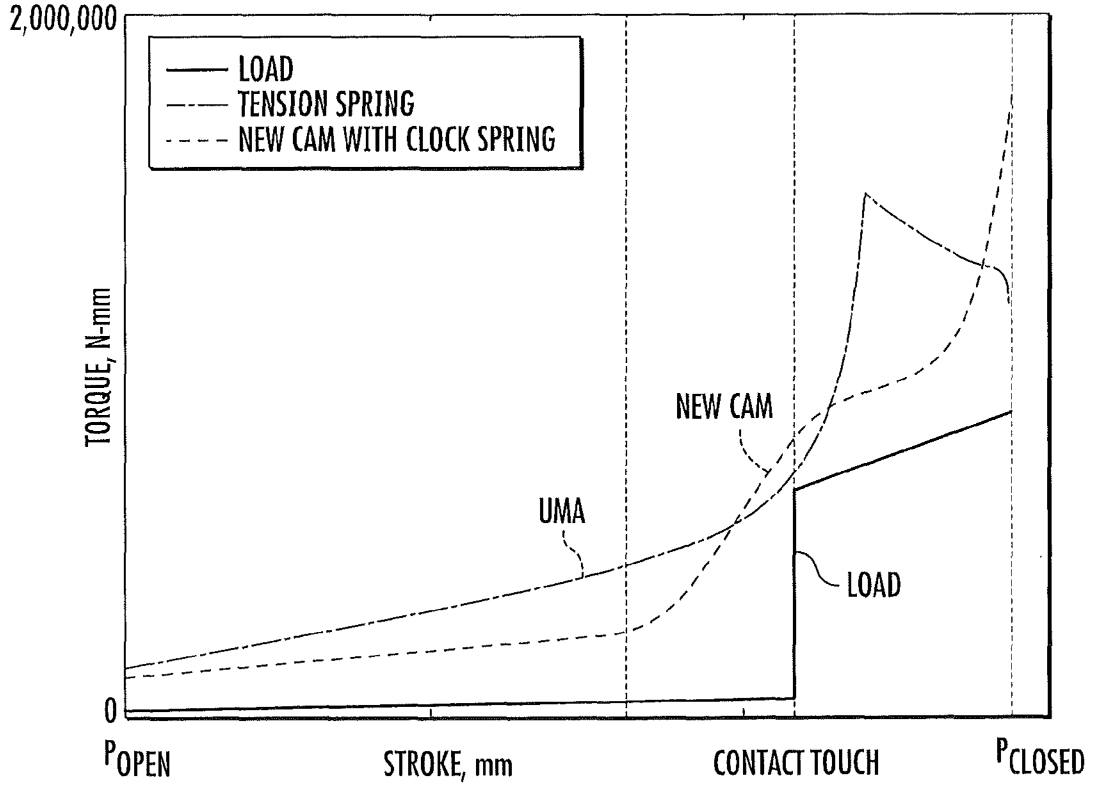
FIG. 10B is a graph illustrating torque (N-mm) versus stroke (mm) of the conventional UMA versus a lobe profile of the drive cam according to embodiments of the present invention shown in FIG. 10A.

FIG. 10B is a graph illustrating torque (N-mm) versus stroke (mm) provided by different operator mechanisms based on the multi-lobe drive cam profile 26 with a clock spring on the same drive shaft 20 illustrating a torque reduction (and a reduction of maximal moments) over current UMA configurations with a tension spring illustrated in the adjacent (overlying) drive cam schematic in FIG. 10A. The cam design of the multi-lobe cam 26 has multiple working outlines in one revolution or cycle, e.g., it defines a plurality of trip open positions Po and a plurality of trip close positions Pc as the follower 33 travels over the perimeter of the drive cam 26.

Figure 10C:
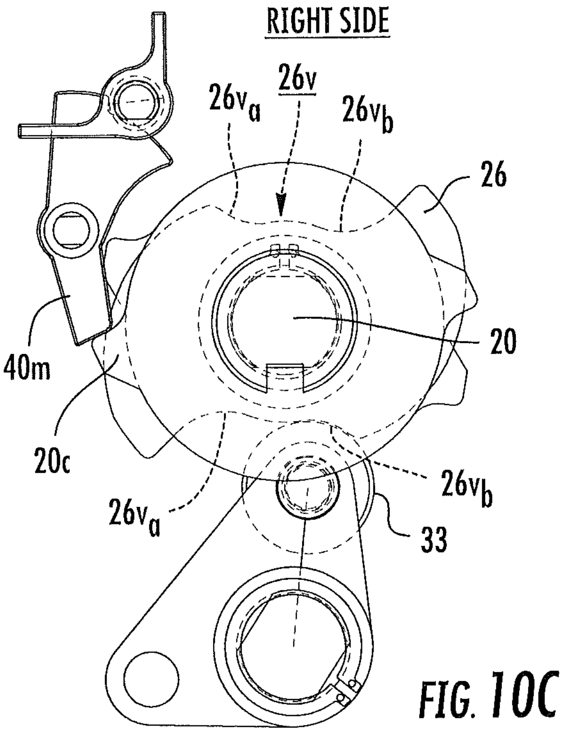
FIGS. 10C and 10D are opposing side views illustrating an embodiment of the new multi-lobe drive cam corresponding to that shown in FIG. 10A, shown in position on a cam shaft according to embodiments of the present invention.
Figure 10D:
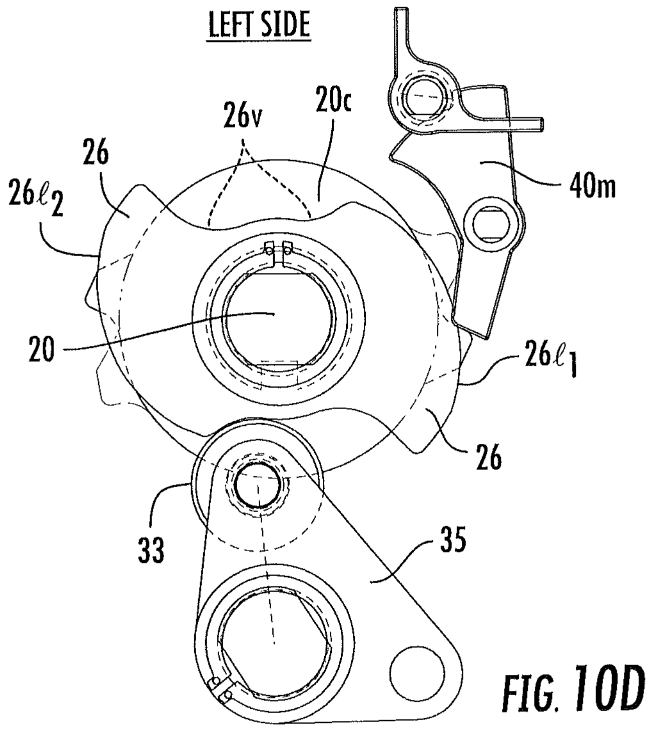

FIGS. 10C and 10D illustrate an exemplary drive cam 26 related to that shown in FIG. 10A in position on a cam shaft 20. The valley 26*v* of the cam profile can have a curvilinear segment with two adjacent valleys 26$v_a$, 26$v_b$ having a radius of curvature corresponding to that of the follower 33 between each lobe 26$l_1$, 26$l_2$. The valleys 26$v_a$, 26$v_b$ can be concave (curved inward) valleys separated by a rise which can be a convex (curved outward) segment. The valleys 26$v_a$, 26$v_b$ can be shallow so as to receive only a small portion of the follower 33 (e.g., less than about 20% of the diameter of the follower). The drive cam 26 may optionally be used with a stop cam 20*c* and a latch member 40*m*, as shown by way of example only.

The clock spring(s) 15 on the cam shaft 20 are closing springs and the motor M rotates to charge the clock springs 15.

Figure 11:
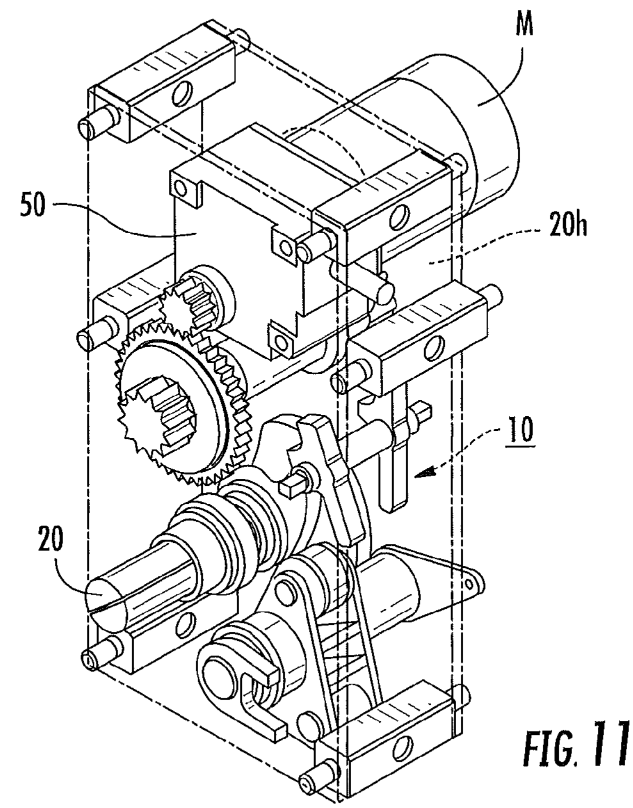
FIG. 11 is a side perspective view of an operator mechanism in a housing according to embodiments of the present invention.
Figure 12:
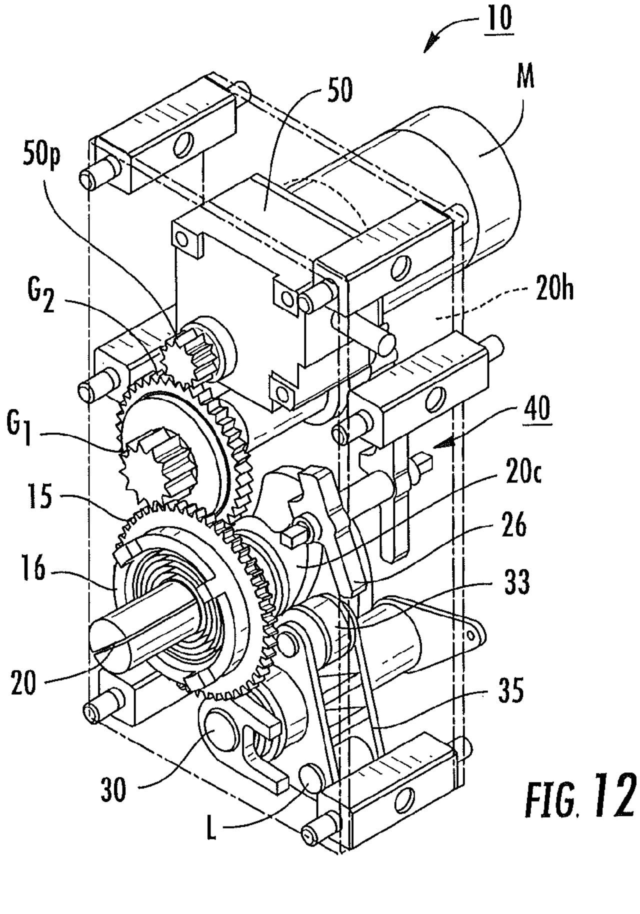
FIG. 12 is a side perspective view of an operator mechanism with a clock-spring as the closing spring in a compact footprint/housing according to embodiments of the present invention.

FIGS. 11 and 12 illustrate that the operator mechanism 10 can be held in a relatively compact footprint, typically in a housing 20*h*. For example, the housing 20*h* can have compact dimensions of about 285 mm×145 mm×206 mm, in some particular embodiments. This results from, for example, about an 85% reduction in spring volume allowed by the clock spring 15 configuration of the closing drive.

Figure 13:
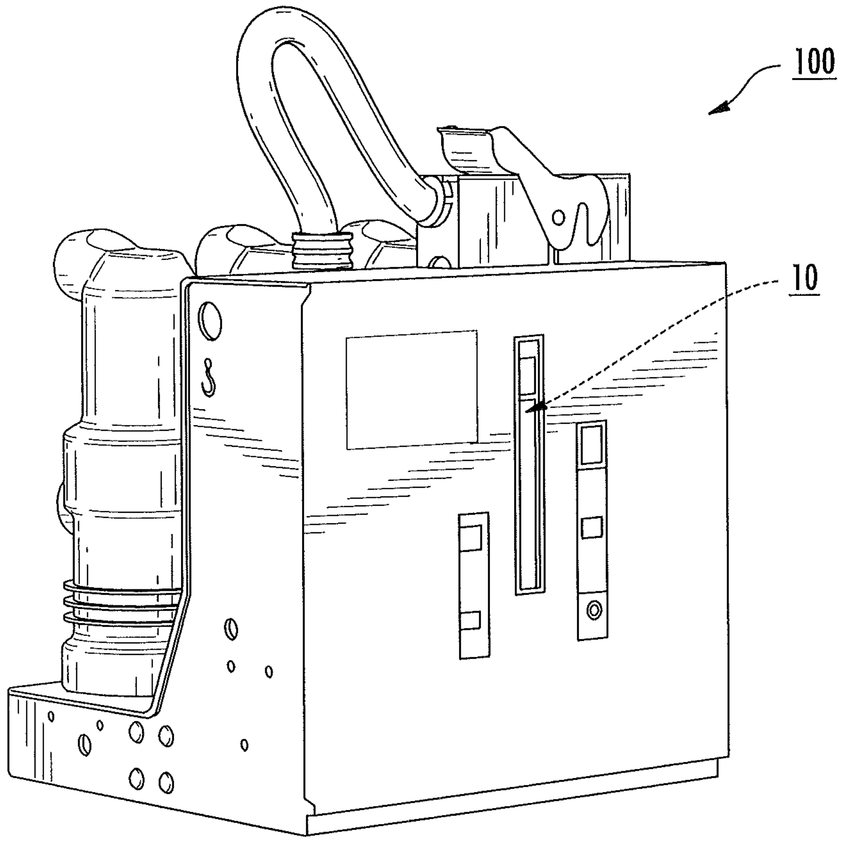
FIG. 13 is an example of a circuit breaker comprising the operator mechanism with the clock-spring as the closing spring according to embodiments of the present invention.

FIG. 13 illustrates an exemplary breaker 100 that can include the new operator mechanism 10. The circuit breaker 100 can be a vacuum circuit breaker of a low, medium or large voltage rating. In some particular embodiments, it is a medium voltage vacuum circuit breaker. Breakers are available in various sizes typically as small, medium and large units with arc extinguishing units such as vacuum interrupters, e.g., low, medium or high voltage circuit breakers. In particular embodiments, the vacuum circuit breaker can be a medium voltage circuit breaker. By way of example, but without limitation, the breakers can include medium voltage type units, e.g., between about 3 kV to about 72 kV, including about 5 kV, about 12 kV, about 15 kV, about 24 kV, about 38 kV, about 40.5 kV and the like. However, the operator mechanisms 10 with the clock spring as the closing drive spring and/or drive cam 26 may also be used with high voltage or low voltage type units e.g., the latter typically less than 1 kV.

Figure 14A:
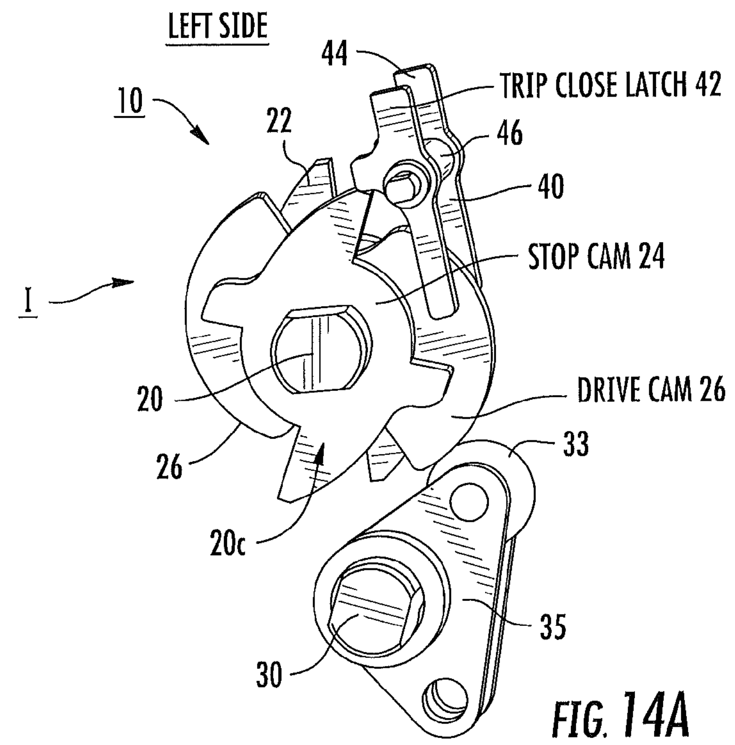
FIG. 14A is a left side perspective view of an exemplary trip latch assembly according to embodiments of the present invention.
Figure 14B:
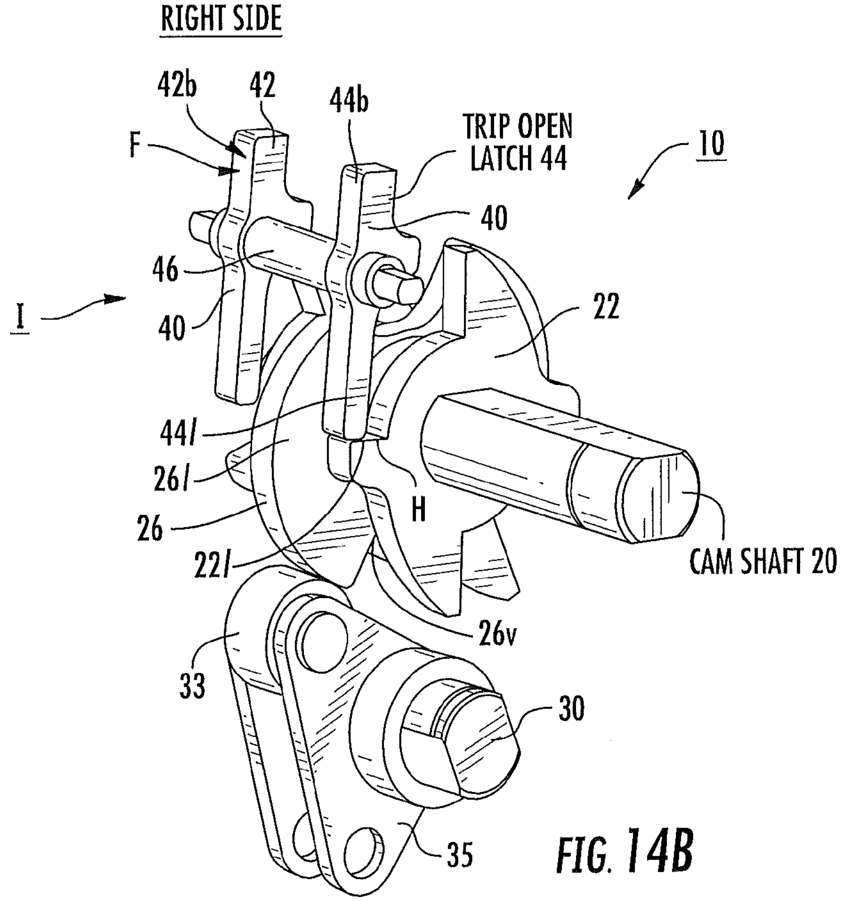
FIG. 14B is a right side perspective view of the trip latch assembly shown in FIG. 14A.

In some particular embodiments, the operator mechanism 10 can optionally include a latch assembly 40 with at least one stop cam 20*c* and at least one latch member 40*m* as discussed briefly above. As shown in FIGS. 14A and 14B the trip latch assembly 40 typically includes a first stop cam 22 and a second stop cam 24. Although shown as two stop cams 20*c*, more than two may also be used. It is also contemplated that one stop cam may be used in conjunction with a different latch configuration for the trip open latch or the trip close latch. Where at least two stop cams are employed, the drive cam 26 can be held between two, e.g., the first and second stop cams 22, 24. However, other latch assemblies may be used.

In some embodiments, the trip latch assembly 40 can also include two latches, a trip-close latch 42 and a trip-open latch 44. The trip-open and trip-close latches 42, 44, respectively, can be held on a single trip latch shaft 46 as shown or may be held on separate shafts (not shown). The trip-close latch 42 is in cooperating alignment with the second stop cam 24 while the trip-open latch 44 is in cooperating alignment with the first stop cam 22. The trip-close and trip-open latches 42, 44, respectively, can move in response to the position and shape of the respective aligned stop cam 24, 22. Each stop cam 22, 24 can be keyed to the trip latch shaft 46 so that rotation of one stop cam can rotate the shaft and the other stop cam. Rotation of any cam 22, 24, 26 can rotate the shaft and other cam including the stop and drive cam. The stop cams 22, 24 can be fixed to the same stop cam shaft.

Figure 15A:
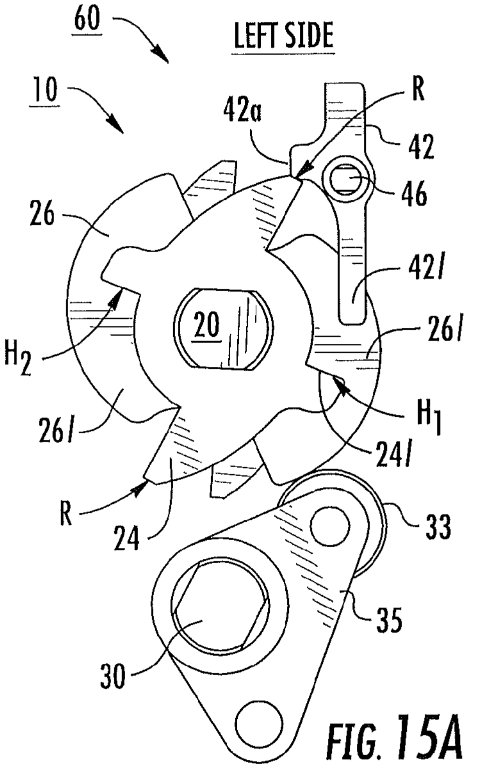
FIG. 15A is a left side view and FIG. 15B is a right side view of the trip latch assembly shown in FIGS. 14A and 14B, illustrated in a trip close position according to embodiments of the present invention.
Figure 15B:
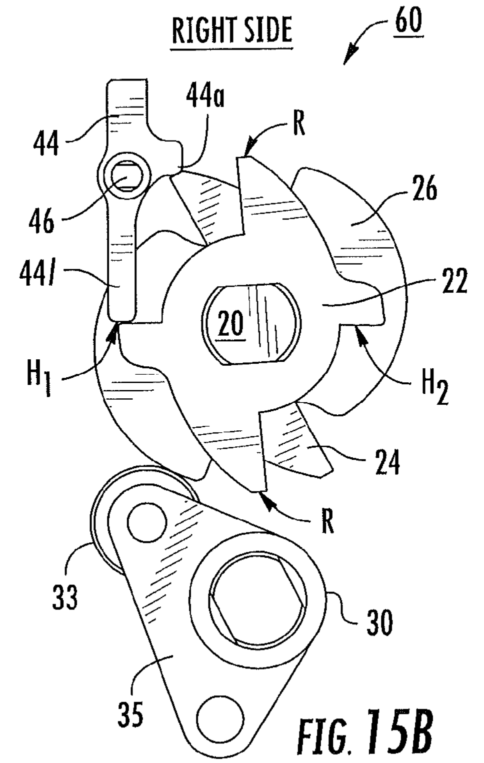

The first and second stop cams 22, 24 can each be configured to be able to hold the drive cam 26 in desired open and close positions so as to open and close the breaker 100 (FIGS. 15A, 15B). That is, the first and second stop cams 22, 24 can be configured to indirectly hold the main shaft 30 in the opened and closed positions.

Figure 16A:
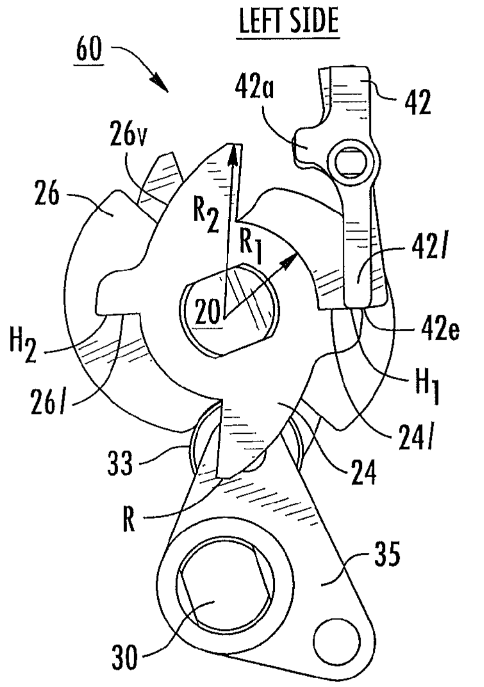
FIG. 16A is a left side view and FIG. 16B is a right side view of the trip latch assembly shown in FIGS. 14A and 14B, illustrated in a trip open position according to embodiments of the present invention.
Figure 16B:
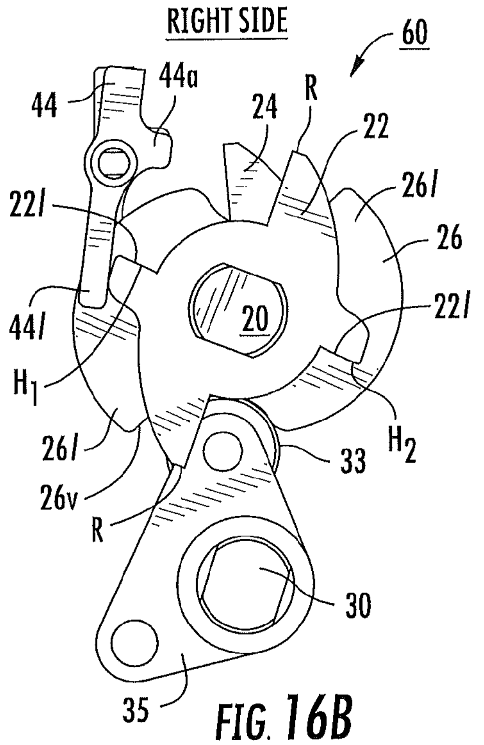
Figure 17A:
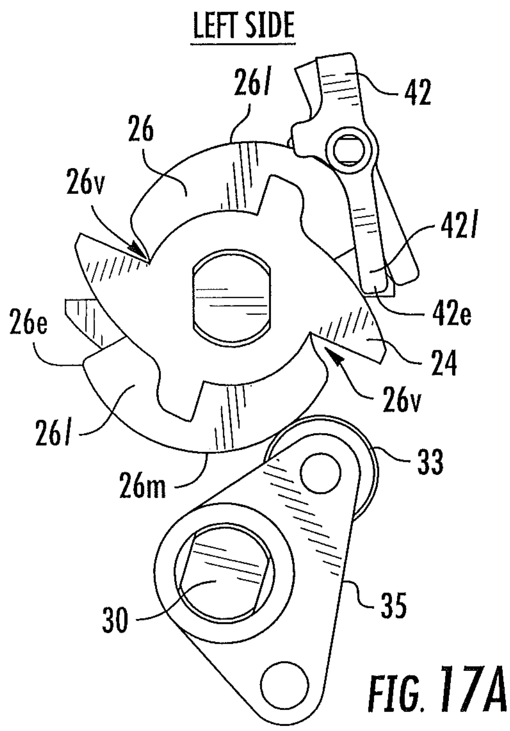
FIG. 17A is a left side view and FIG. 17B is a right side view of the trip latch assembly shown in FIGS. 14A and 14B, illustrating exemplary component orientation and position from a trip open position to a trip close position, according to embodiments of the present invention.
Figure 17B:
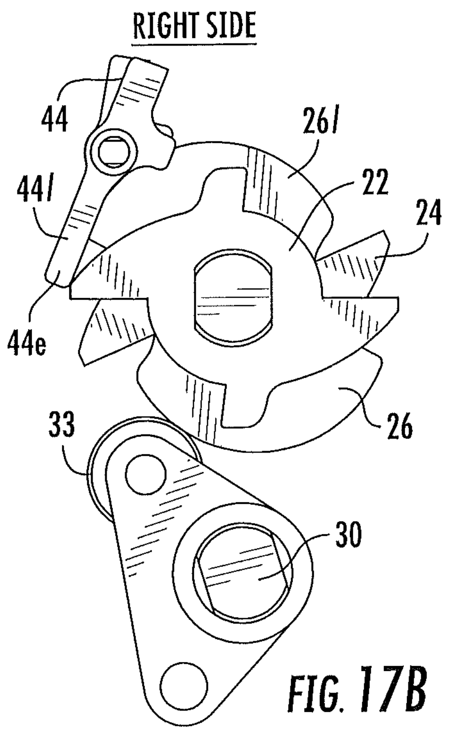
Figure 18A:
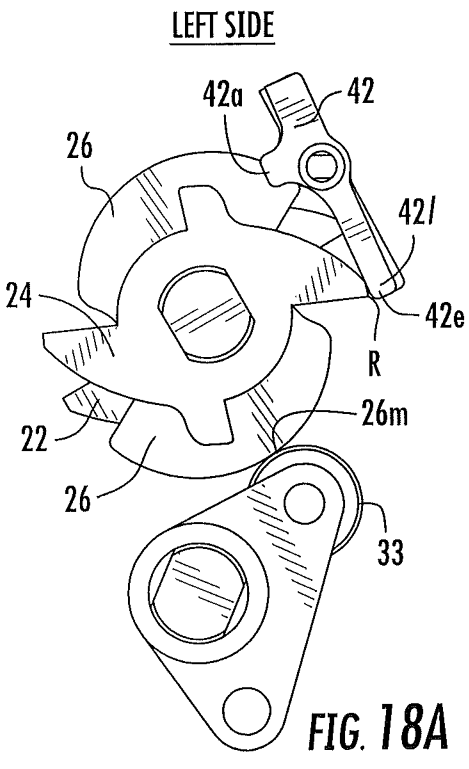
FIG. 18A is a left side view and FIG. 18B is a right side view of the trip latch assembly shown in FIGS. 14A and 14B, illustrating exemplary component orientation and position from a trip open position to a trip close position, according to embodiments of the present invention.
Figure 18B:
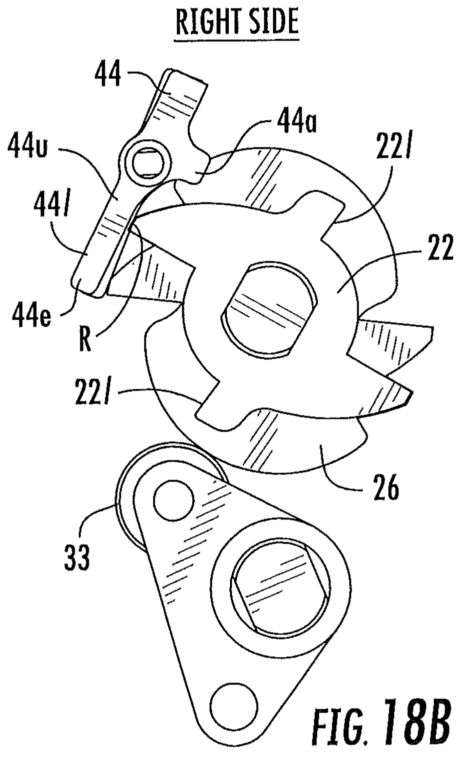

To change a "locked" status, a force F can be applied to the upper back portion 44*b* of the trip-open latch 44. This will pivot the trip-open latch 44 to disengage from the respective stop cam 22. In turn, this allows drive cam 26 to turn a sufficient amount before the trip-close latch 42 engages the next stop of the second stop cam 24 at trip open hold point one ($H_1$)(FIGS. 16A, 16B). Typically, the drive cam 26 moves between about 10 degrees to about 40 degrees from the trip-open latch release to the trip-close latch engagement, more typically between about 20-25 degrees, such as about 20 degrees, about 21 degrees, about 22 degrees, about 23 degrees or about 24 degrees. In this process, the trip-open latch 42 can be pushed back to its initial status by the second stop cam 24 (e.g., by turning the shaft 46 to tilt the trip-open latch).

FIGS. 14A and 14B illustrate an interlock configuration I when the operator mechanism 10 (FIG. 1) is in a closed breaker status. Thus, in the interlock configuration I pushing the trip-close latch 42 with a linkage, actuator, lever or other electromechanically operated member against upper end portion 42*b* with a force F will not cause a change in the drive shaft position.

In some embodiments, the first and second stop cams 22, 24 can be configured to hold the drive cam 26 in a desired position associated with a closed or open breaker position while held on the same cam shaft 20 and can also be configured to carry out a latch unit recovery.

FIGS. 15A and 15B illustrates a trip close position with the follower 33 in contact with a lobe 26*l* of the drive cam 26 to position the drive shaft 30 away from the cam shaft 20 and/or stop cams 22, 24. FIGS. 16A and 16B illustrate a trip open position with the follower 33 in the cam valley 26*v* allowing the main shaft 30 to reside closer to the cam shaft 20 and/or the stop cams 22, 24 relative to the trip close position (e.g., FIGS. 2A and 2B). As noted above, FIG. 14A illustrates an interlock I position. In the interlock position I, the first stop cam 22 engages the leg 44*l* of the trip open latch 44 at the ledge 22*l* forming a holding point H.

In some embodiments, the first and second stop cams 22, 24 can have the same size and shape, including the same cam surface perimeter profile shape. The trip-open and trip-close latches 42, 44 can also have the same shape and size. However, it is also contemplated that the stop cams 22, 24 can have different sizes and/or shapes as may respective latch members 42, 44.

The trip latch shaft 46 can be held at a position that is above and laterally offset from the cam shaft 26 to hold at least one of the trip-open or trip-close latch in cooperating alignment with a respective stop cam 20*c*.

Referring to FIGS. 15A, 15B, 16A and 16B, as shown, the stop cams 22, 24 can be configured to have at least two hold points $H_1$, $H_2$, shown as two hold points. The hold points $H_1$, $H_2$ can be configured with respective planar ledges 22*l*, 24*l* extending radially outward a distance from an adjacent segment with a smaller radial dimension. The ledges 24*l*, 22*l* can be sized and configured to receive a lower end of a leg 42*l*, 44*l* of a corresponding trip-open latch 44 or trip-close latch 42. Optionally, the ledges 22*l*, 24*l* can have embossed, scored and/or coated surfaces to increase surface friction and therefore frictional engagement of the lower end of the legs 42*l*, 44*l*.

As shown, the stop cams 22, 24 can be configured to have at least one (shown as two) recovery point R. The at least one recovery point R resides between the holding points $H_1$, $H_2$. In the exemplary embodiment shown, the stop cams 22, 24 each have two circumferentially spaced apart recovery points R, one between each hold point $H_1$, $H_2$. The stop cams 22, 24 can be configured with a curvilinear shape that forms two holding point ledges and two fins that taper outward to a maximal radius $R_2$ at the recovery point R, then extend straight in at an orthogonal surface to a segment having a first smaller radius $R_1$ (FIG. 16A). The hold points $H_1$, $H_2$ can be diametrically opposed as can be the recovery points R, where two recovery points are used.

In some embodiments, the drive cam 26 can have two diametrically opposing arcuate lobes 26*l* circumferentially spaced apart by inwardly curved valleys 26*v*. However, other drive cam configurations may be used. For example, the drive cam 26 can include more than two circumferentially spaced apart lobes 26*l*.

In the trip close position, as shown in FIGS. 15A and 15B, a lower leg 421 of the trip-close latch 42 is not in a hold position $H_1$ or $H_2$ and is typically not even in contact with the second stop cam 24. However, an arm 42*a* of the trip-close latch 42 proximate the shaft 46 can contact/rest against a recovery point R on the stop cam 24. The trip-close latch 42 can be configured so that the leg 42*l* extends downwardly to be substantially vertical (+/−10 degrees of vertical) in the trip close position and resides above a trip open hold point $H_1$. As shown in FIG. 14B, the leg 44*l* of the trip open latch 44 resides on the trip close holding point $H_1$ of the second stop cam 24 allowing the second cam 24 to make the trip close latch recovery.

Figure 19A:
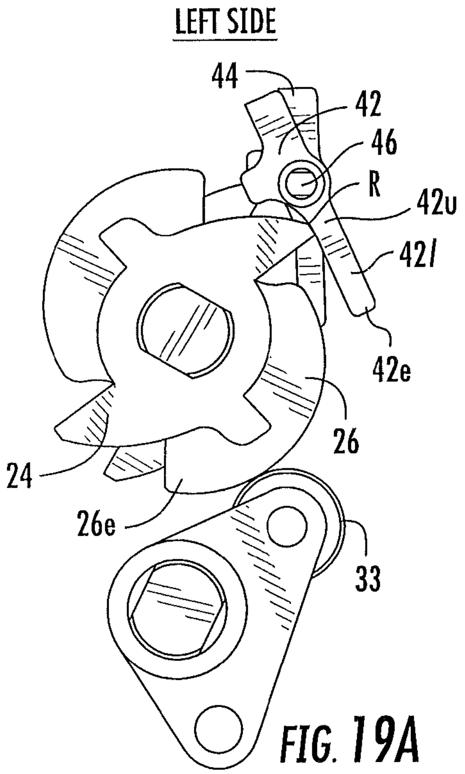
FIG. 19A is a left side view and FIG. 19B is a right side view of the trip latch assembly shown in FIGS. 14A and 14B, illustrating exemplary component orientation and position from a trip open position to a trip close position, according to embodiments of the present invention.
Figure 19B:
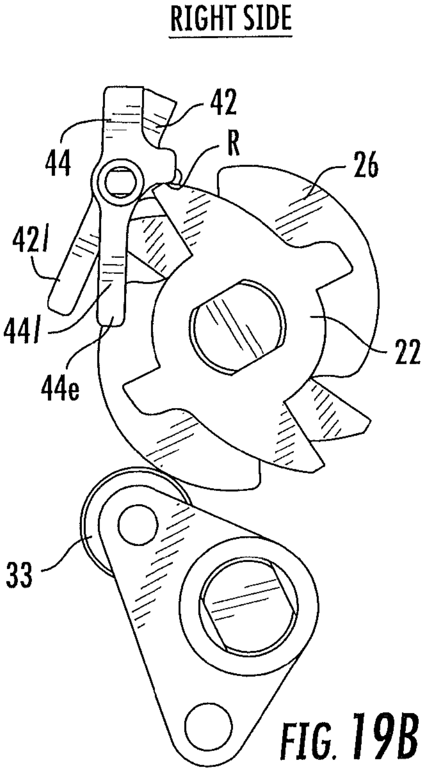
Figure 20A:
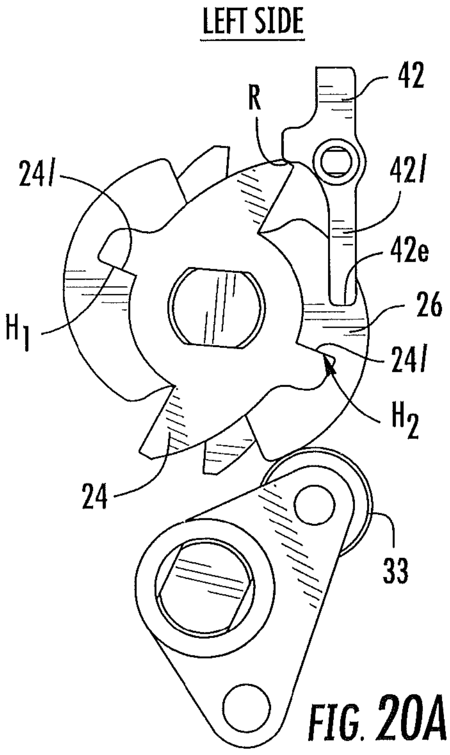
FIG. 20A is a left side view and FIG. 20B is a right side view of the trip latch assembly shown in FIGS. 14A and 14B, illustrating exemplary component orientation and position from a trip open position to a (second) trip close position, according to embodiments of the present invention.
Figure 20B:
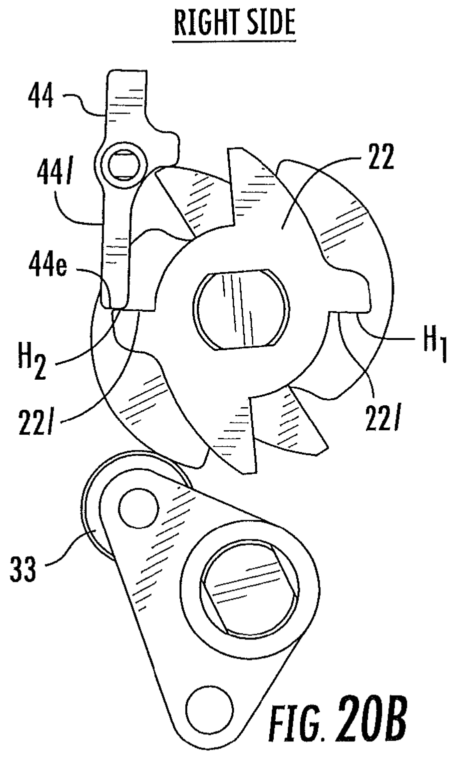

FIGS. 15A, 15B to 20A-20B illustrate component position and movement from a trip open position to a trip close position. FIGS. 20A and 20B illustrate the second trip close position (FIGS. 15A and 15B illustrate the first trip close position).

The trip-close latch 42 and stop cam 24 can serially move so that the trip close latch 42 goes from being upstanding in the trip open position with the lower end of the leg 42*e* on the hold point $H_1$ of the stop cam 24 (FIG. 16A), to a tilted outward position between a recovery point R and the stop cam 24 holding points $H_1$, $H_2$ (FIG. 17A), to tilt further with the lower end of the leg 42*e* contacting the recovery point R (FIG. 18A), to tilt with the stop cam 24 rotated to position a recovery point R adjacent the trip latch shaft 46 at an upper end of the leg 42*u* (FIG. 19A). In the second trip close position (FIG. 20A), the trip close latch 42 is again substantially upright (e.g., vertical) with the lower end 42*e* above the ledge 24*l* forming the hold point $H_2$.

The trip-open latch 44 and the stop cam 22 can serially move as shown in FIGS. 16B, 17B, 18B, 19B and 20B from the trip open position to the trip closed position. In the trip open position, the trip-open latch 44 moves from a position with the lower end of the leg 44*l* abutting an outer surface of the stop cam 22 proximate the ledge 22*l* at hold point $H_1$ (FIG. 16B), to tilt further out and reside approximate recovery point R (with the stop cam 22 placing the recovery point adjacent the lower end of the leg 44*e* while the hold points $H_1$, $H_2$, and associated ledges 22*l* are substantially vertical (FIG. 17B), to tilt and allow the recovery point R to move upward on the leg 44*l* to an upper portion of the leg 44*u* (FIG. 18B) to then move to have the arm 44*a* contact the recovery point R (FIG. 19B), then move to the trip close position with the lower end of the leg 44*e* residing on the trip close ledge at hold pint $H_2$ (FIG. 20B).

The drive cam 26 moves as allowed by the stop cams 22, 24 and latch members 42, 44 to move the follower 33 and hence the main shaft 30. The drive cam 26 rotates from the trip open position with the follower in a valley 26*v* with the follower residing closer to the cam shaft 20 and/or stop cams 22, 24 (FIG. 16A), to position the follower over an end of one of the lobes 26*l* (FIGS. 17A, 17B), to a more medial location 26*m* along the lobe 26*l* (FIGS. 18A, 18B) to the other end of the lobe 26*e* with the follower 33 positioned further away from the cam shaft 20 and/or the stop cams 22, 24 (FIGS. 19A, 19B to 20A, 20B).

Figure 21:
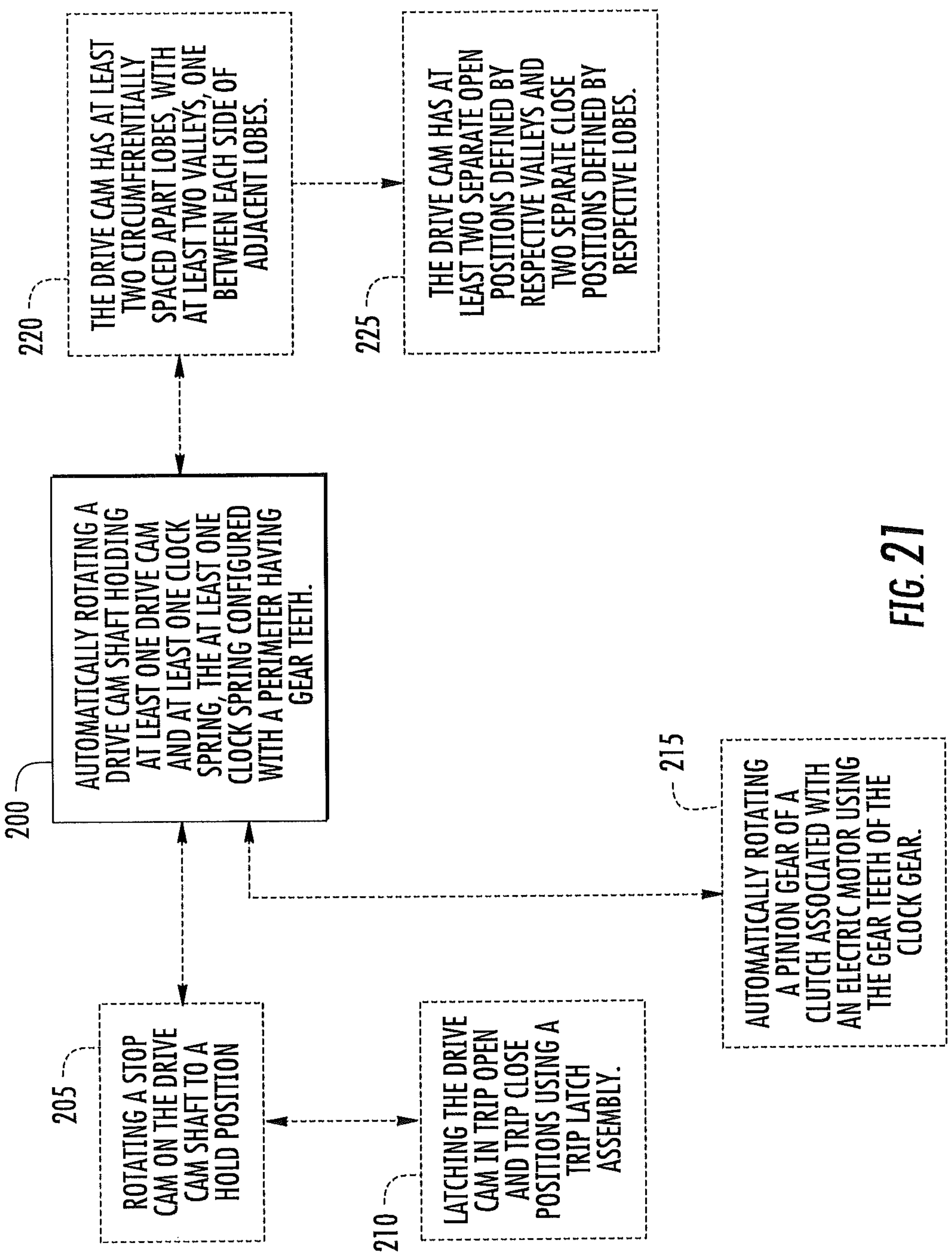
FIG. 21 is a flow chart of exemplary operations that can be used to carry out a closing operation in a circuit breaker according to embodiments of the present invention.

FIG. 21 illustrates exemplary method of operating a circuit breaker that can be used for a closing operation of the circuit breaker. The method can include automatically rotating a drive cam shaft holding at least one drive cam and at least one clock spring, the at least one clock spring configured with a perimeter having gear teeth. The gear teeth can rotate to rotate a pinion associated with a clutch attached to an electric motor. The clock spring is the closing spring. The closing spring can cooperate with the drive cam to move an actuator to move to a close position to electrically close a circuit of a circuit breaker (block 200).

The method can optionally include rotating a stop cam on the drive cam shaft to a hold position (block 205).

The drive cam can be held in a trip open position and a trip close position using a trip latch assembly (that typically, but optionally, includes one or more stop cams on the drive cam shaft) (block 210).

The method can include automatically rotating a pinion gear of a clutch associated with an electric motor using the gear teeth of the at least one clock spring (block 215).

The drive cam can have at least two circumferentially spaced apart lobes, with at least two valleys, one between each side of adjacent lobes (block 220).

The drive cam can have at least two separate open positions defined by respective valleys and two separate close positions defined by respective lobes (block 225).

The method can include automatically rotating a pinion gear of a clutch associated with an electric motor in response to rotation of the clock gear.

The method can be carried out to maintain opening and closing energy and facilitate closing an operation mechanism. Stated differently, the clock-spring can be an actuator drive for an actuator configured to a cause a mobile contact to close against another contact for a closing operation so that a the operator mechanism operatively connects the actuator to the mobile contact.

The latch assembly can be operated by pushing an upper portion of a trip-open latch toward a first stop cam held on a cam shaft also holding a drive cam and a second stop cam to release the trip-open latch from a stop defined by a holding point on a first stop cam; then automatically rotating the drive cam; then rotating a second stop cam so that a trip close-latch engages a stop at a holding point on the second stop cam to prevent further movement of the drive cam.

Figure 22B:
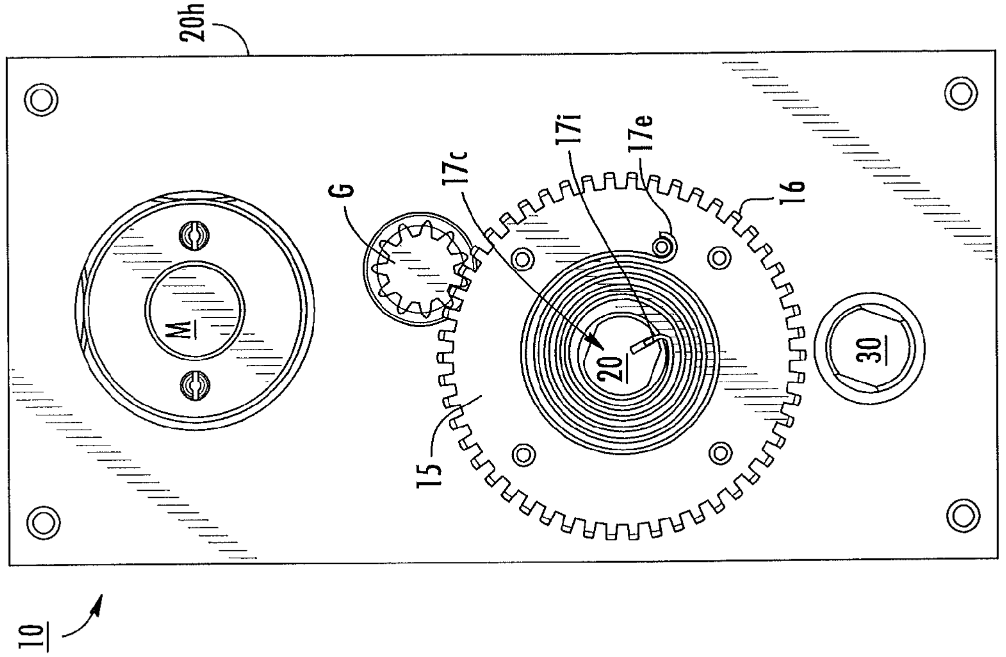
FIG. 22B is a front view of the operator mechanism shown in FIG. 22A according to embodiments of the present invention.
Figure 22A:
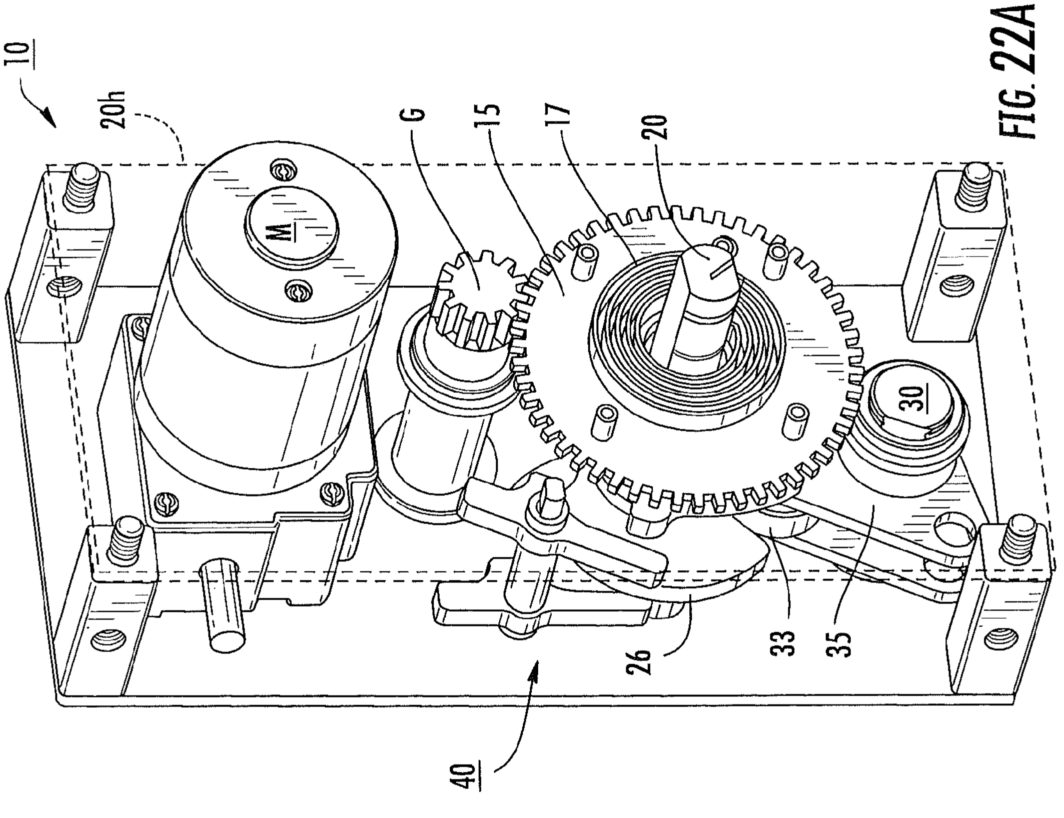
FIG. 22A is a partial side perspective view of an exemplary operator mechanism in a trip open position according to embodiments of the present invention.
Figure 22C:
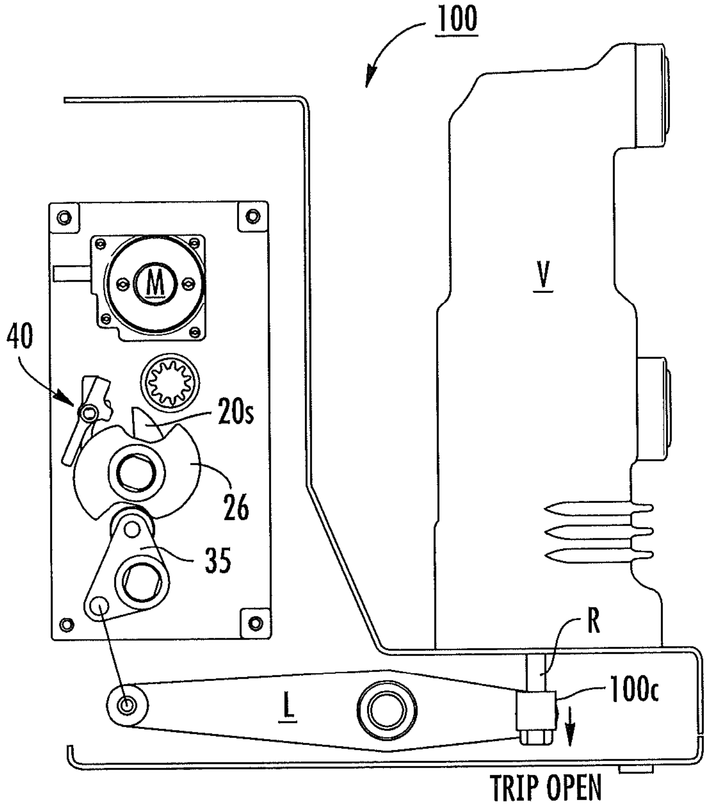
FIG. 22C is a cutaway side view of the operator mechanism shown in FIG. 22A in a circuit breaker and shown as it is connected to a linkage that moves contacts to open and close a circuit breaker according to some embodiments of the present invention.
Figure 22D:
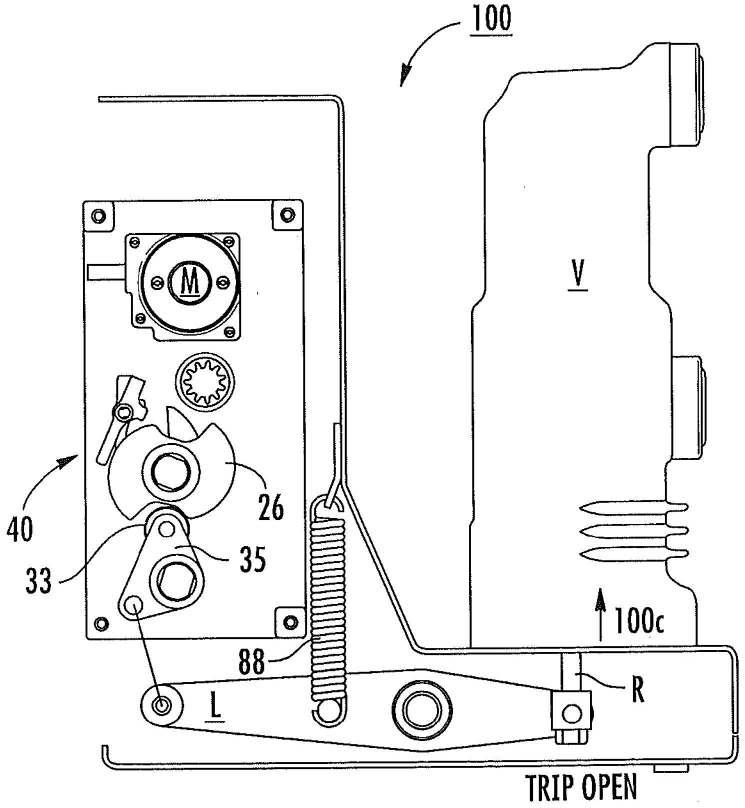
FIG. 22D is a cutaway side view of the operator mechanism in the circuit breaker (shown in a trip close position) shown in FIG. 22C and also illustrating an exemplary opening torsion spring according to embodiments of the present invention.
Figure 23D:
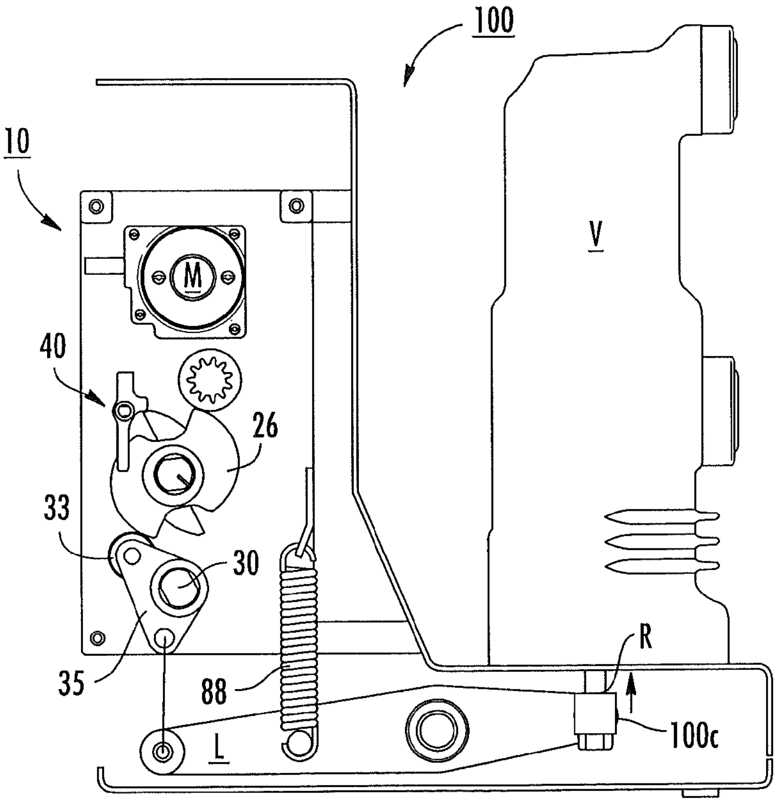
FIG. 23D is a cutaway side view of the operator mechanism in the circuit breaker (shown in a trip close position) shown in FIG. 23C and also illustrating an exemplary opening torsion spring according to embodiments of the present invention.

FIGS. 22A and 22B illustrate the operator mechanism 10 with the components in a trip open position according to embodiments of the present invention. FIGS. 22C and 22D illustrate the linkage L attached to move a circuit interrupter R (shown as an upwardly extending rod/link) to open and close contacts 100*c*. FIG. 22D also includes the closing spring 88.

FIGS. 23A and 23B illustrate the operator mechanism 10 with the components in a trip open position according to embodiments of the present invention. FIG. 23C illustrates the linkage L attached to a circuit interrupter R to be able to move the interrupter (e.g., rod/link) R to open and close a vacuum interrupter VI contact(s) 100*c* and FIG. 23D also shows an exemplary opening torsion spring 88 attached to the linkage L.

The clock spring 15 with the gear 16 can be configured to remain static except in an energy storage process. The clock spring 17 can release energy when the status of the breaker changes. When the cam shaft 20 rotates one revolution, the clock spring gear 15 can be driven by the transmission to make the spring 17 store energy. In some embodiments, the clock spring 15 can push the main cam shaft 26 to rotate a desired amount between a trip close to a trip open position. The desired amount can be between about 10-40 degrees, typically a small amount of between about 10-25 degrees, more typically between about 20-25 degrees, such as about 20 degrees, about 21 degrees, about 22 degrees, about 23 degrees, about 24 degrees and about 25 degrees, from a trip close to a trip open position. FIGS. 22B and 23B show a small rotational change in shaft orientation (shown by the orientation change of the flats in the outer wall perimeter of the shaft) between the trip open and close positions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. An actuator device, comprising:

at least one clock spring comprising a disc shaped body with gear teeth and a spiral spring;

a cam shaft holding the at least one clock spring with an inner end portion of the spiral spring attached to the cam shaft; and a drive cam held by the cam shaft adapted to be in communication with a follower that is mechanically linked to a circuit interrupter, wherein the drive cam comprises a perimeter with valleys associated with trip open positions of a circuit breaker and lobes associated with trip closed positions of the circuit breaker thereby providing multiple hold locations for trip open and trip closed positions in a single revolution of the drive cam.

2. The device of claim 1, wherein the disc shaped body of the at least one clock spring has an outer perimeter, wherein the gear teeth reside on the perimeter and are in communication with a pinion of a clutch attached to an electric motor, and wherein the at least one clock spring is configured as a closing spring of a spring operated actuator for the circuit interrupter.

3. The device of claim 1, wherein the at least one clock spring comprises a plurality of clock springs, and wherein the plurality of clock springs are all attached to the drive cam shaft such that rotation of the drive cam shaft in a defined direction compresses the spiral springs.

4. The device of claim 1, wherein the at least one clock spring is a plurality of clock springs attached to the drive cam shaft for modular build configurations to thereby provide scalable build options across a range of different voltage, current and short circuit current ranges of circuit breakers.

5. The device of claim 1, wherein the spiral spring of the at least one clock spring is static except during an energy storage process, and wherein the clock spring stores potential energy that is released when energy status of the circuit interrupter changes.

6. The device of claim 1, wherein the drive cam perimeter has multiple holding locations for trip open and trip closed positions in a single revolution based on the lobes and valleys, and wherein a minima radian of at least one valley is circumferentially separated from an adjacent maxima radian of at least one adjacent lobe by between about 5 to about 20 degrees.

7. An operator mechanism for an electrical circuit of a circuit breaker or electrical switching apparatus, comprising:

at least one clock spring comprising a disc shaped body with gear teeth and a spiral spring;

a cam shaft holding the at least one clock spring with an inner end portion of the spiral spring attached to the cam shaft;

a drive cam held by the cam shaft, wherein the drive cam comprises a perimeter with valleys associated with trip open positions of a circuit breaker and lobes associated with trip closed positions of the circuit breaker thereby providing multiple hold locations for trip open and trip closed positions in a single revolution of the drive cam;

a follower held in cooperating alignment with the drive cam;

an electric motor having a clutch with a pinion, the pinion in communication with the gear teeth of the at least one clock spring; and a linkage in communication with the follower that directs an actuator to open or close a mobile contact to maintain open and closed energy status of the electrical circuit.

8. The mechanism of claim 7, wherein the disc shaped body of the at least one clock spring has an outer perimeter, wherein the gear teeth reside on the perimeter and are in communication with the pinion of a clutch attached to an electric motor, and wherein the at least one clock spring is configured as a closing spring.

9. The mechanism of claim 7, wherein the at least one clock spring comprises a plurality of clock springs to thereby provide scalable build options across a range of different voltage current and short circuit current circuit breakers, and wherein the plurality of clock springs are all attached to the drive cam shaft such that rotation of the drive cam shaft in a defined direction compresses the spiral springs.

10. An operator mechanism for an electrical circuit of a circuit breaker, comprising:

a cam shaft;

a drive cam held by the cam shaft, wherein the drive cam comprises a cam profile with a plurality of lobes and valleys, wherein the valleys are associated with trip open positions of the circuit breaker and the lobes are associated with trip closed positions of the circuit breaker thereby providing multiple hold locations for trip open and trip closed positions in a single revolution of the drive cam;

a follower held in cooperating alignment with the drive cam;

an electric motor having a clutch with a pinion, the pinion in communication with the cam shaft; and a linkage in communication with the follower that directs an actuator to open or close a mobile contact to maintain open and closed energy status of the electrical circuit.

11. The operator mechanism of claim 10, wherein a minima radian of a respective valley is circumferentially separated from an adjacent maxima radian of a respective lobe by between about 5 to about 20 degrees.

12. A method of using a spring-actuated closing spring in a circuit breaker, comprising:

automatically rotating a drive cam shaft holding at least one drive cam and at least one clock spring with a respective spiral spring, wherein one of the at least one clock spring comprises gear teeth, wherein an inner end portion of a respective spiral spring of the at least one clock spring is configured to extend as a planar segment across a center gap space inside turns of the respective spiral spring, and wherein the drive cam shaft comprises an outer end portion with a radially extending slot that slidably receives the planar segment of a respective spiral spring;

automatically compressing and uncompressing a respective spiral spring of the at least one clock spring responsive to winding and unwinding rotation directions of the drive cam shaft;

turning a pinion gear associated with clutch attached to an electric motor based on rotation of the clock spring gear teeth; and opening and closing an electric circuit based on whether the drive cam is in an open position or a closed position.

13. The method of claim 12, wherein successive opening and closing operations are carried out based on drive cam movements of less than 90 degrees with the drive cam configured to rotate in a single direction and provide a plurality of serially alternating closing and opening positions about its 360 degree perimeter.

14. An actuator device, comprising:

at least one clock spring comprising a disc shaped body with gear teeth and a spiral spring;

a cam shaft holding the at least one clock spring with an inner end portion of the spiral spring attached to the cam shaft; and a drive cam held by the cam shaft adapted to be in communication with a follower that is mechanically linked to a circuit interrupter, wherein the drive cam has a perimeter with a plurality of spaced apart lobes and a plurality of spaced apart valleys arranged such that adjacent lobes are separated by a respective valley, and wherein each lobe defines a trip close position and each valley defines a trip open position of the electrical circuit.

15. An actuator device, comprising:

at least one clock spring comprising a disc shaped body with gear teeth and a spiral spring;

a cam shaft holding the at least one clock spring with an inner end portion of the spiral spring attached to the cam shaft; and a drive cam held by the cam shaft adapted to be in communication with a follower that is mechanically linked to a circuit interrupter, wherein the drive cam comprises a cam profile with three lobes and three valleys with the valleys associated with trip open positions of a circuit breaker and the lobes associated with trip closed positions of the circuit breaker, wherein a minima radian of a respective valley is circumferentially separated from an adjacent maxima radian of a respective lobe by between about 5 to about 20 degrees.

16. An actuator device, comprising:

at least one clock spring comprising a disc shaped body with gear teeth and a spiral spring;

a cam shaft holding the at least one clock spring with an inner end portion of the spiral spring attached to the cam shaft; and a drive cam held by the cam shaft adapted to be in communication with a follower that is mechanically linked to a circuit interrupter, wherein the drive cam comprises a cam profile with two lobes and two valleys, with the valleys associated with trip open positions of a circuit breaker and the lobes associated with trip closed positions of the circuit breaker, wherein a minima radian of a respective valley is circumferentially separated from an adjacent maxima radian of a respective lobe by between about 5 to about 20 degrees.

17. An actuator device, comprising:

at least one clock spring comprising a disc shaped body with gear teeth and a spiral spring;

a cam shaft holding the at least one clock spring with an inner end portion of the spiral spring attached to the cam shaft; and a drive cam held by the cam shaft adapted to be in communication with a follower that is mechanically linked to a circuit interrupter, wherein the inner end portion of a respective spiral spring of the at least one clock spring is configured to extend as a planar segment across a center gap space inside turns of the spiral spring, and wherein the drive cam shaft comprises an outer end portion with a radially extending slot that slidably receives the planar segment of a respective spiral spring.

18. An actuator device, comprising:

at least one clock spring comprising a disc shaped body with gear teeth and a spiral spring;

a cam shaft holding the at least one clock spring with an inner end portion of the spiral spring attached to the cam shaft;

a drive cam held by the cam shaft adapted to be in communication with a follower that is mechanically linked to a circuit interrupter; and a follower residing against the drive cam and a main shaft in communication with the follower configured to maintain open and closed energy status of the circuit breaker responsive to a position of the drive cam, and wherein the drive cam comprises a cam profile with a first lobe that merges into two adjacent shallow valleys, that merge into a second lobe that then merges into two adjacent shallow valleys, with the valleys associated with trip open positions of a circuit breaker and the lobes associated with trip closed positions of the circuit breaker.

19. An operator mechanism for an electrical circuit of a circuit breaker or electrical switching apparatus, comprising:

at least one clock spring comprising a disc shaped body with gear teeth and a spiral spring;

a cam shaft holding the at least one clock spring with an inner end portion of the spiral spring attached to the cam shaft;

a drive cam held by the cam shaft;

a follower held in cooperating alignment with the drive cam;

an electric motor having a clutch with a pinion, the pinion in communication with the gear teeth of the at least one clock spring; and a linkage in communication with the follower that directs an actuator to open or close a mobile contact to maintain open and closed energy status of the electrical circuit, wherein the drive cam has a perimeter with a plurality of spaced apart lobes and a plurality of spaced apart valleys, such that adjacent lobes are separated by at least one valley, and wherein each lobe defines a trip closing position and the valleys define a trip opening position of the electrical circuit thereby providing multiple hold locations for trip open and trip closed positions in a single revolution of the drive cam.

20. An operator mechanism for an electrical circuit of a circuit breaker or electrical switching apparatus, comprising:

at least one clock spring comprising a disc shaped body with gear teeth and a spiral spring;

a cam shaft holding the at least one clock spring with an inner end portion of the spiral spring attached to the cam shaft;

a drive cam held by the cam shaft;

a follower held in cooperating alignment with the drive cam;

an electric motor having a clutch with a pinion, the pinion in communication with the gear teeth of the at least one clock spring; and a linkage in communication with the follower that directs an actuator to open or close a mobile contact to maintain open and closed energy status of the electrical circuit, wherein the drive cam comprises a cam profile with three lobes and at least three valleys, with the valleys associated with trip open positions of the circuit breaker and the lobes associated with trip closed positions of the circuit breaker, wherein a minima radian of a respective valley is circumferentially separated from an adjacent maxima radian of a respective lobe by between about 5 to about 20 degrees.

21. An operator mechanism for an electrical circuit of a circuit breaker or electrical switching apparatus, comprising:

at least one clock spring comprising a disc shaped body with gear teeth and a spiral spring;

a cam shaft holding the at least one clock spring with an inner end portion of the spiral spring attached to the cam shaft;

a drive cam held by the cam shaft;

a follower held in cooperating alignment with the drive cam;

an electric motor having a clutch with a pinion, the pinion in communication with the gear teeth of the at least one clock spring; and a linkage in communication with the follower that directs an actuator to open or close a mobile contact to maintain open and closed energy status of the electrical circuit, wherein the drive cam comprises a cam profile with two lobes and two valleys, with the valleys associated with trip open positions of a circuit breaker and the lobes associated with trip closed positions of the circuit breaker, wherein a minima radian of a respective valley is circumferentially separated from an adjacent maxima radian of a respective lobe by between about 5 to about 20 degrees.

22. An operator mechanism for an electrical circuit of a circuit breaker or electrical switching apparatus, comprising:

at least one clock spring comprising a disc shaped body with gear teeth and a spiral spring;

a cam shaft holding the at least one clock spring with an inner end portion of the spiral spring attached to the cam shaft;

a drive cam held by the cam shaft;

a follower held in cooperating alignment with the drive cam;

an electric motor having a clutch with a pinion, the pinion in communication with the gear teeth of the at least one clock spring; and a linkage in communication with the follower that directs an actuator to open or close a mobile contact to maintain open and closed energy status of the electrical circuit, wherein the at least one clock spring is a plurality of clock springs attached to the drive cam shaft, and wherein inner end portions of the spiral springs extend as axially spaced apart planar segments across a center gap spaced formed by turns of the spiral spring, and wherein the single rotatable shaft comprises an outer end portion with a radially extending slot that slidably receives the planar segments of the spiral springs.

* * * * *